United States Patent [19]

Anderson et al.

[11] 4,209,828

[45] Jun. 24, 1980

[54] SPEED DECODING AND SPEED ERROR DETERMINING CONTROL APPARATUS AND METHOD

[75] Inventors: Larry W. Anderson, W. Mifflin; Donald L. Rush, Penn Hills; Michael P. McDonald, Pittsburgh, all of Pa.

[73] Assignee: Westinghouse Electric Corp., Pittsburgh, Pa.

[21] Appl. No.: 920,317

[22] Filed: Jun. 28, 1978

[51] Int. Cl.² .................. B61L 3/20; B61L 27/04
[52] U.S. Cl. .................. 364/426; 246/182 R; 364/424; 371/68
[58] Field of Search ............... 364/424, 426; 318/563–565, 587; 340/147 PC, 167 B, 170, 171 PF; 178/66 R; 235/304, 307; 246/182 B, 182 C, 182 R

[56] References Cited

U.S. PATENT DOCUMENTS

| 3,749,994 | 7/1973 | Matty .................. 318/563 |
| 3,810,161 | 5/1974 | Sahasrabudhe .......... 340/170 R |
| 3,931,505 | 1/1976 | Sevcik ................. 235/307 |
| 3,992,698 | 11/1976 | Sahasrabudhe et al. ... 340/167 B |
| 4,015,082 | 3/1977 | Matty et al. ........... 340/171 PF |
| 4,107,253 | 8/1978 | Borg et al. ............ 364/426 |
| 4,130,241 | 12/1978 | Meredith et al. ........ 235/307 |

OTHER PUBLICATIONS

Hoyler, Automatic Train Control Concepts are Implemented by Modern Equipment, Westinghouse Engineer, Sep. 1962, pp. 145-151.
Costa et al., Sao-Paulo Metro E-W Line Innovations, IAS Annual Meeting of the IEEE Industry Applications Society, Oct. 1977, pp. 1105-1109.
Gibson, Bay Area Transit System Will Have Automated Central Control, Westinghouse Engineer, Mar. 1970, pp. 51-54.
Hoyler, Design Techniques for Automatic Train Control, Westinghouse Engineer, Jul. 1972, pp. 98-103.
Brownson et al., Computers Will Aupervise Automatic Train Operations in Bay Area, Railway Signalling and Communications, Jul. 1969, pp. 27-38.
Thorne-Booth, Signalling of Remskely Controlled Railway Trains, IEEE Transactions on Communications Technology, vol. Com-16, No. 3, Jun. 1968, pp. 369-374.
Bollinger, The BARTD Train Control System Railway Signalling and Communications, Dec. 1967, pp. 18-23.

*Primary Examiner*—Felix D. Gruber
*Attorney, Agent, or Firm*—R. G. Brodahl

[57] ABSTRACT

A speed decoding and error determining control apparatus and method are disclosed, including two independently programmed microprocessors responsive to a desired speed command from the wayside for determining respective speed errors for a coupled passenger vehicle, which speed errors must compare within a predetermined tolerance before the speed command is permitted to control the actual speed of the passenger vehicle.

14 Claims, 15 Drawing Figures

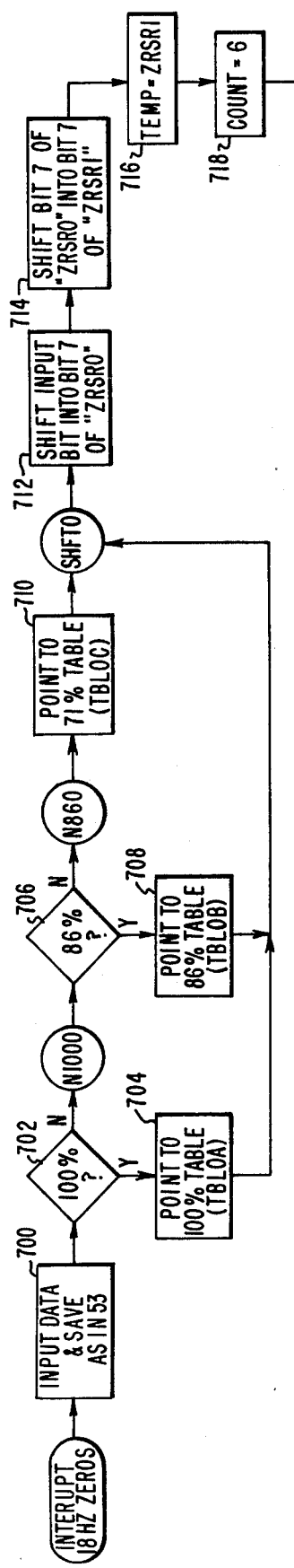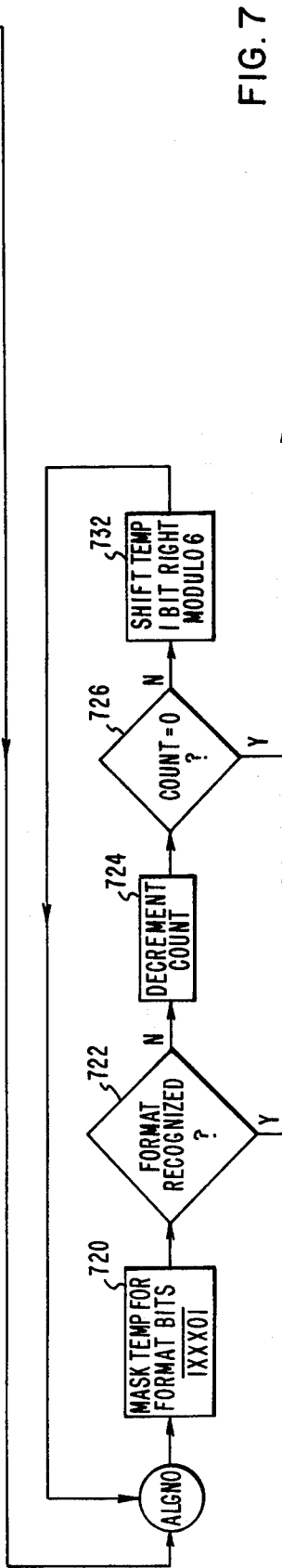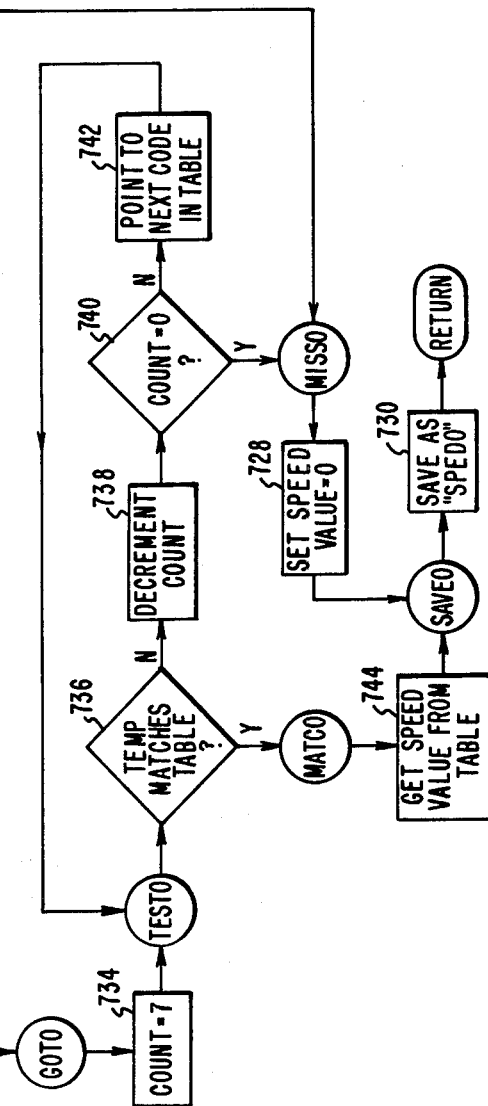
FIG. 7

1400 ONE'S DATA

| SCTBO (BINARY) | | | | | | | | | KPH |
|---|---|---|---|---|---|---|---|---|---|
| 1 | 0 | 1 | 1 | 1 | 1 | 0 | 0 | | 100 |
| 1 | 0 | 0 | 1 | 1 | 1 | 0 | 0 | | 87 |
| 1 | 0 | 1 | 0 | 1 | 1 | 0 | 0 | | 75 |
| 1 | 0 | 0 | 0 | 1 | 1 | 0 | 0 | | 62 |
| 1 | 0 | 0 | 1 | 0 | 1 | 0 | 0 | | 44 |
| 1 | 0 | 1 | 0 | 0 | 1 | 0 | 0 | | 30 |
| 1 | 0 | 0 | 0 | 0 | 1 | 0 | 0 | | 10 |
| 1 | 0 | 0 | 0 | 0 | 0 | 0 | 0 | | 0 |

1406

1402 ZERO'S DATA

| SCTBZ (BINARY) | | | | | | | | | KPH |
|---|---|---|---|---|---|---|---|---|---|
| 1 | 0 | 1 | 1 | 1 | 1 | 0 | 0 | | 100 |
| 1 | 0 | 0 | 1 | 1 | 1 | 0 | 0 | | 87 |
| 1 | 0 | 1 | 1 | 0 | 1 | 0 | 0 | | 75 |
| 1 | 0 | 0 | 0 | 1 | 1 | 0 | 0 | | 62 |
| 1 | 0 | 0 | 1 | 0 | 1 | 0 | 0 | | 44 |
| 1 | 0 | 1 | 0 | 0 | 1 | 0 | 0 | | 30 |
| 1 | 0 | 0 | 0 | 0 | 1 | 0 | 0 | | 10 |
| 1 | 0 | 0 | 0 | 0 | 0 | 0 | 0 | | 0 |

1404 SPEED

| SPEED (BINARY) | | | | | | | | | KPH |
|---|---|---|---|---|---|---|---|---|---|
| 1 | 0 | 0 | 0 | 0 | 0 | 0 | 0 | | 100 |
| 0 | 1 | 0 | 0 | 0 | 0 | 0 | 0 | | 87 |
| 0 | 0 | 1 | 0 | 0 | 0 | 0 | 0 | | 75 |
| 0 | 0 | 0 | 1 | 0 | 0 | 0 | 0 | | 62 |
| 0 | 0 | 0 | 0 | 1 | 0 | 0 | 0 | | 44 |
| 0 | 0 | 0 | 0 | 0 | 1 | 0 | 0 | | 30 |
| 0 | 0 | 0 | 0 | 0 | 0 | 1 | 0 | | 10 |
| 0 | 0 | 0 | 0 | 0 | 0 | 0 | 1 | | 0 |

SCVLO (DECIMAL)
| | |
|---|---|
| 200 | = 100 × 2 |
| 174 | = 87 × 2 |
| 148 | = 74 × 2 |
| 123 | = 61.5 × 2 |
| 88 | = 44 × 2 |
| 60 | = 30 × 2 |
| 20 | = 10 × 2 |
| 0 | = 0 |

SCVLZ (DECIMAL)
| | |
|---|---|
| 200 | = 100 × 2 |
| 174 | = 87 × 2 |
| 148 | = 74 × 2 |
| 123 | = 61.5 × 2 |
| 88 | = 44 × 2 |
| 60 | = 30 × 2 |
| 20 | = 10 × 2 |
| 0 | = 0 |

1408

C71VO (DECIMAL)
| | |
|---|---|
| 141 | = 70.5 × 2 |
| 122 | = 61 × 2 |
| 104 | = 52 × 2 |
| 86 | = 43 × 2 |
| 62 | = 31 × 2 |
| 42 | = 21 × 2 |
| 14 | = 7 × 2 |
| 0 | = 0 |

C71VZ (DECIMAL)
| | |
|---|---|
| 141 | = 70.5 × 2 |
| 122 | = 61 × 2 |
| 104 | = 52 × 2 |
| 86 | = 43 × 2 |
| 62 | = 31 × 2 |
| 42 | = 21 × 2 |
| 14 | = 7 × 2 |
| 0 | = 0 |

1410

C86VO (DECIMAL)
| | |
|---|---|
| 172 | = 86 × 2 |
| 149 | = 74.5 × 2 |
| 127 | = 63.5 × 2 |
| 106 | = 53 × 2 |
| 75 | = 37.5 × 2 |
| 51 | = 25.5 × 2 |
| 17 | = 8.5 × 2 |
| 0 | = 0 |

C86VZ (DECIMAL)
| | |
|---|---|
| 172 | = 86 × 2 |
| 149 | = 74.5 × 2 |
| 127 | = 63.5 × 2 |
| 106 | = 53 × 2 |
| 75 | = 37.5 × 2 |
| 51 | = 25.5 × 2 |
| 17 | = 8.5 × 2 |
| 0 | = 0 |

1412

CTIMO (DECIMAL)
| | |
|---|---|
| 34 | = #SEC × 18 |
| 34 | = " " " |
| 34 | = " " " |
| 34 | = " " " |
| 34 | = " " " |
| 16 | = " " " |
| 16 | = " " " |
| 16 | = " " " |

CTIMZ (DECIMAL)
| | |
|---|---|
| 34 | = #SEC × 18 |
| 34 | = " " " |
| 34 | = " " " |
| 34 | = " " " |
| 34 | = " " " |
| 16 | = " " " |
| 16 | = " " " |
| 16 | = " " " |

1500 — 100% SPEED CODE (TBL1A)

| | | | | | | | |
|---|---|---|---|---|---|---|---|
| 1 | 0 | 0 | 0 | 0 | 1 | 0 | 0 |

10 KPH SPEED — 1504

| 1 | 0 | 0 | 1 | 0 | 1 | 0 | 0 |

30 KPH SPEED

| 1 | 0 | 1 | 0 | 0 | 1 | 0 | 0 |

44 KPH SPEED

| 1 | 1 | 0 | 0 | 0 | 1 | 0 | 0 |

61.5 KPH SPEED

| 1 | 1 | 0 | 1 | 0 | 1 | 0 | 0 |

74 KPH SPEED

| 1 | 1 | 1 | 0 | 0 | 1 | 0 | 0 |

87 KPH SPEED

| 1 | 1 | 1 | 1 | 0 | 1 | 0 | 0 |

100 KPH SPEED

*FORMAT BITS IN CODE

1502 — 100% SPEED CODE (TBL0A)

| 0 | 0 | 1 | 1 | 1 | 1 | 0 | 0 |

10 KPH SPEED

| 0 | 0 | 1 | 1 | 0 | 1 | 0 | 0 |

30 KPH SPEED

| 0 | 0 | 1 | 0 | 1 | 1 | 0 | 0 |

44 KPH SPEED

| 0 | 0 | 0 | 1 | 1 | 1 | 0 | 0 |

61.5 KPH SPEED

| 0 | 0 | 0 | 1 | 0 | 1 | 0 | 0 |

74 KPH SPEED

| 0 | 0 | 0 | 0 | 1 | 1 | 0 | 0 |

87 KPH SPEED

| 0 | 0 | 0 | 0 | 0 | 1 | 0 | 0 |

100 KPH SPEED

*FORMAT BITS IN CODE

86% SPEED CODE (TBL1B)

| 1 | 0 | 0 | 0 | 0 | 1 | 0 | 0 |

8.5 KPH SPEED — 1506

| 1 | 0 | 0 | 1 | 0 | 1 | 0 | 0 |

25.5 KPH SPEED

| 1 | 0 | 1 | 0 | 0 | 1 | 0 | 0 |

37.5 KPH SPEED

| 1 | 1 | 0 | 0 | 0 | 1 | 0 | 0 |

53 KPH SPEED

| 1 | 1 | 0 | 1 | 0 | 1 | 0 | 0 |

63.5 KPH SPEED

| 1 | 1 | 1 | 0 | 0 | 1 | 0 | 0 |

74.5 KPH SPEED

| 1 | 1 | 1 | 1 | 0 | 1 | 0 | 0 |

86 KPH SPEED

86% SPEED CODE (TBL0B)

| 0 | 0 | 1 | 1 | 1 | 1 | 0 | 0 |

8.5 KPH SPEED

| 0 | 0 | 1 | 1 | 0 | 1 | 0 | 0 |

25.5 KPH SPEED

| 0 | 0 | 1 | 0 | 1 | 1 | 0 | 0 |

37.5 KPH SPEED

| 0 | 0 | 0 | 1 | 1 | 1 | 0 | 0 |

53 KPH SPEED

| 0 | 0 | 0 | 1 | 0 | 1 | 0 | 0 |

63.5 KPH SPEED

| 0 | 0 | 0 | 0 | 1 | 1 | 0 | 0 |

74.5 KPH SPEED

| 0 | 0 | 0 | 0 | 0 | 1 | 0 | 0 |

86 KPH SPEED

71% SPEED CODE (TBL1C)

| 1 | 0 | 0 | 0 | 0 | 1 | 0 | 0 |

7 KPH SPEED — 1508

| 1 | 0 | 0 | 1 | 0 | 1 | 0 | 0 |

21 KPH SPEED

| 1 | 0 | 1 | 0 | 0 | 1 | 0 | 0 |

31 KPH SPEED

| 1 | 1 | 0 | 0 | 0 | 1 | 0 | 0 |

43 KPH SPEED

| 1 | 1 | 0 | 1 | 0 | 1 | 0 | 0 |

52 KPH SPEED

| 1 | 1 | 1 | 0 | 0 | 1 | 0 | 0 |

61 KPH SPEED

| 1 | 1 | 1 | 1 | 0 | 1 | 0 | 0 |

70.5 KPH SPEED

71% SPEED CODE (TBL0C)

| 0 | 0 | 1 | 1 | 1 | 1 | 0 | 0 |

7 KPH SPEED

| 0 | 0 | 1 | 1 | 0 | 1 | 0 | 0 |

21 KPH SPEED

| 0 | 0 | 1 | 0 | 1 | 1 | 0 | 0 |

31 KPH SPEED

| 0 | 0 | 0 | 1 | 1 | 1 | 0 | 0 |

43 KPH SPEED

| 0 | 0 | 0 | 1 | 0 | 1 | 0 | 0 |

52 KPH SPEED

| 0 | 0 | 0 | 0 | 1 | 1 | 0 | 0 |

61 KPH SPEED

| 0 | 0 | 0 | 0 | 0 | 1 | 0 | 0 |

70.5 KPH SPEED

---

IN53: DATA BYTES IN RAM — INPUT PORT 53 DATA
COC86 — ONES DATA
COC71

ONESR: IN — LATEST DATA SHIFT REGISTER
MSB           LSB

SPED1: DECODED SPEED FROM ONES DATA MODIFIED CUT OUT CAR

IN53: DATA BYTES IN DATA — INPUT PORT 53 DATA
COC86 — ZERO DATA
COC71

ZRSRO: IN — LATEST DATA SHIFT REGISTER
ZRSRI: IN — OLD DATA SHIFT REGISTER
MSB           LSB

SPED0: DECODED SPEED FROM ZEROS DATA MODIFIED CUT OUT CAR

SPEED DECODING AND SPEED ERROR DETERMINING CONTROL APPARATUS AND METHOD

CROSS-REFERENCE TO RELATED APPLICATIONS

The present application is related to the following concurrently filed patent applications which are assigned to the same assignee as the present application, and the respective disclosures of which are incorporated herein by reference:

1. Ser. No. 920,319, which was filed on June 28, 1978 by L. W. Anderson and A. P. Sahasrabudhe and entitled "Speed Maintaining Control Of Train Vehicles";
2. Ser. No. 920,318, which was filed on June 28, 1978 by D. L. Rush and entitled "Program Stop Control Of Train Vehicles";
3. Ser. No. 920,043, which was filed on June 28, 1978 by M. P. McDonald, T. D. Clark and R. H. Perry and entitled "Train Vehicle Control Multiplex Train Line";
4. Ser. No. 920,104, which was filed on June 28, 1978 by D. L. Rush and J. K. Kapaidia and entitled "Door Control For Train Vehicles";
5. Serial No. 920,316, which was filed on June 28, 1978 by L. W. Anderson and M. P. McDonald and entitled "Train Vehicle Control Microprocessor Power Reset"; and
6. Ser. No. 920,315, which was filed on JUne 28, 1978 by D. L. Rush and A. P. Sahasrabudhe and entitled "Desired Velocity Control For Passenger Vehicles".

BACKGROUND OF THE INVENTION

The present invention relates to the automatic control of passenger vehicles, such as mass transit vehicles or the like, and including the decoding of wayside provided speed codes for vehicles speed control and speed maintenance purposes while the vehicle is moving along a track.

In an article entitled The BARTD Train Control System published in Railway Signaling and Communications for December 1967 at pages 18 to 23, the train control system for the San Francisco Bay Area Rapid Transit District is described. Other articles relating to the same train control system were published in the IEEE Transactions On Communication Technology for June 1968 at pages 369 to 374, in Railway Signaling and Communications for July 1969 at pages 27 to 38, in the Westinghouse Engineer for March 1970 at pages 51 to 54, in the Westinghouse Engineer for July 1972 at pages 98 to 103, and in the Westinghouse Engineer for September 1972 at pages 145 to 151. A general description of the train control system to be provided for the East-West line of the Sao Paulo Brazil Metro is provided in an article published in IAS 1977 Annual of the IEEE Industry Applications Society at pages 1105 to 1109.

It was known in the prior art to provide a checked redundancy speed error determination as disclosed in U.S. Pat. No. 3,749,994 of T. C. Matty. It was also known in the prior art to provide coded ones and zero speed signals, with the message information frequency coded and the timing information phase coded as disclosed in U.S. Pat. No. 3,810,161 of A. P. Sahasrabudhe. It was known to provide a speed command signal decoding apparatus as disclosed in U.S. Pat. No. 3,992,698 of A. P. Sahasrabudhe et al. It was also known in the prior art to individually decode the ones data and the zeros data, and then compare them to detect any discrepancy as disclosed in U.S. Pat. No. 4,015,082 of T. C. Matty et al.

A general description of the microprocessors and the related peripheral devices as shown in FIGS. 1 and 2 of the drawings is provided in the Intel 8080 Microcomputer System Users Manual currently available from Intel Corp., Santa Clara, California 95051.

SUMMARY OF THE INVENTION

An improved passenger vehicle speed control apparatus and method are provided for decoding desired speed codes to determine speed of travel along a track. The speed decoding and speed error calculations are a part of the vital speed control system. The method of implementation is to do the logic in two independent microprocessors and compare the outputs in a failsafe manner. In addition to the failsafe speed error comparison, each microprocessor has a dynamic output bit toggling at a 9 Hz rate when the decoding and error calculation is being executed. These two independent dynamic signals must be present and the two independent speed errors must compare within a given tolerance before the speed commands are allowed to effect the movement of the train.

BRIEF DESCRIPTION OF THE DRAWINGS

FIG. 7 illustrates the zeros speed code data decoding program of a first programmer;

FIG. 14 shows the speed data tables utilized by the programs shown in FIGS. 11, 12 and 13; and FIG. 15 shows the speed data tables utilized by the programs shown in FIGS. 7, 8 and 9.

DESCRIPTION OF A PREFERRED EMBODIMENT

Figure 1:
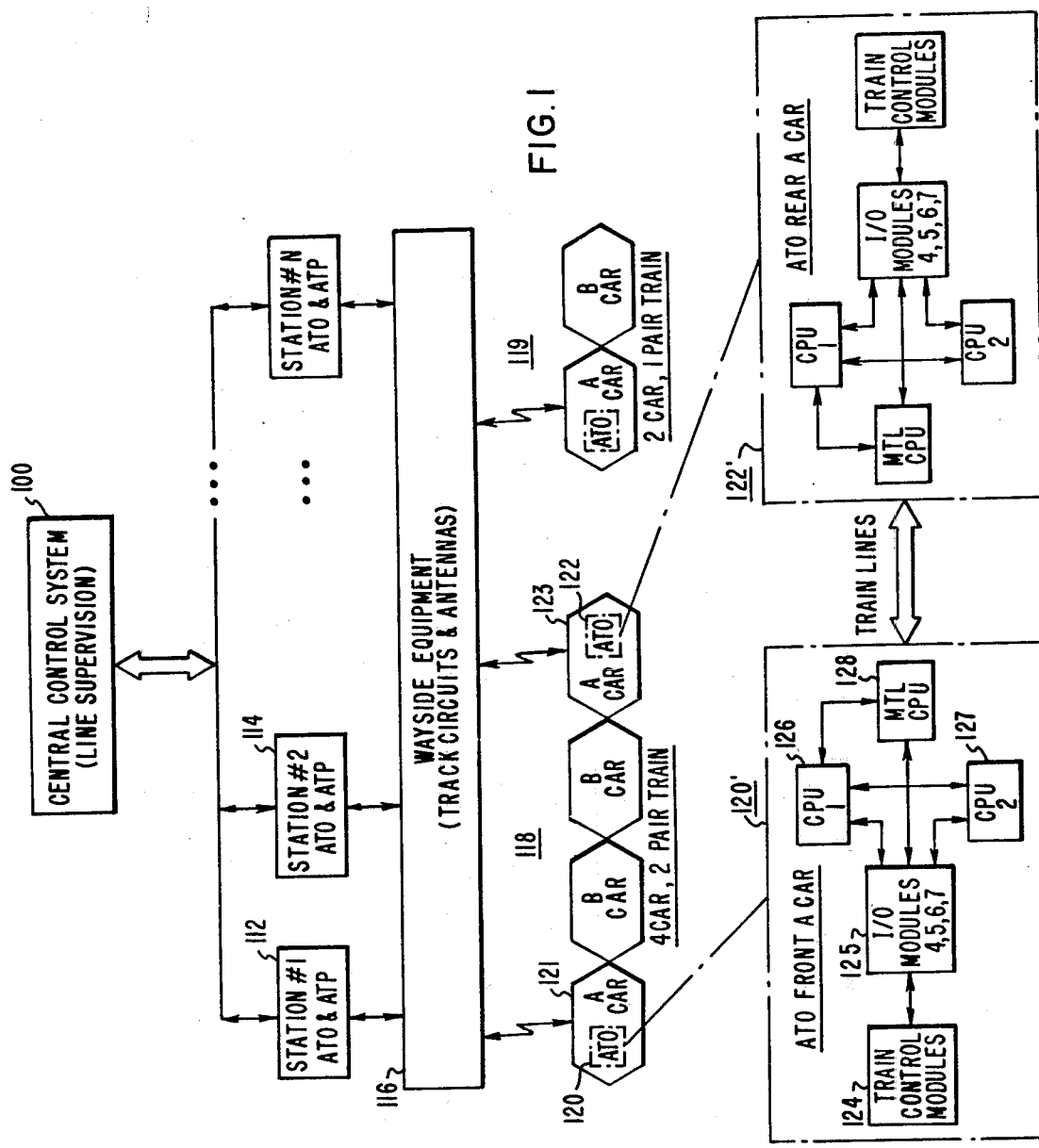
FIG. 1 is a schematic showing of the passenger train vehicle control system operative with the present control apparatus.

As shown in FIG. 1, the central control system 100, which is usually located in a headquarters building or the like, receives information about the transit system and individual vehicle train operation to apply desired performance adjustments to the individual vehicle trains. The central control supervises the schedules, and spacing and routing of the trains. The passenger loading and unloading stations 112, 114 and so forth up to N are provided to operate with the central control 100 as desired for any particular transit system. The wayside equipment 116, including track circuits and antennae, is located along the vehicle track between the stations and is provided to convey control information in relation to the passenger vehicles passing along the track. A first train 118 is shown including four vehicle cars in the arrangement of an A type car at each end of the train with intermediate B type cars. A second train 119 is shown including two vehicle cars, with one being an A type car including computer control apparatus and one being a B type car which includes no train control equipment. The train control apparatus 120 carried by the front A type car 121 of the first train 118 is shown in greater detail in the phantom showing 120' of the front car 121. Similarly, the train control apparatus 122 carried by the rear A type car 123 is shown in greater detail in the phantom showing 122' of the rear car 123. The train control modules 124 in the train control apparatus 120' includes the program stop receiver module, the speed code receiver module, the vital interlock board, power supplies and all the modules required to interface with the other equipment carried by the train vehicle 121. Information is sent in relation to the input/output modules 125, and the microprocessor computers 126, 127 and 128. There is a direct communication link through the input/output modules 125 between the CPU1 computer 126 and the CPU2 computer 127. There is a direct communication link from the CPU1 computer 126 to the multiplex train line MTL CPU computer 128. A similar train control apparatus 122 is provided for the rear car 123. The front car 121 and the rear car 123 are connected together through well-known train lines, which go through the couplers and the individual train vehicles. The multiplex train line connected between the front multiplex CPU and the rear multiplex CPU is one pair of lines in the train line.

Figure 2:
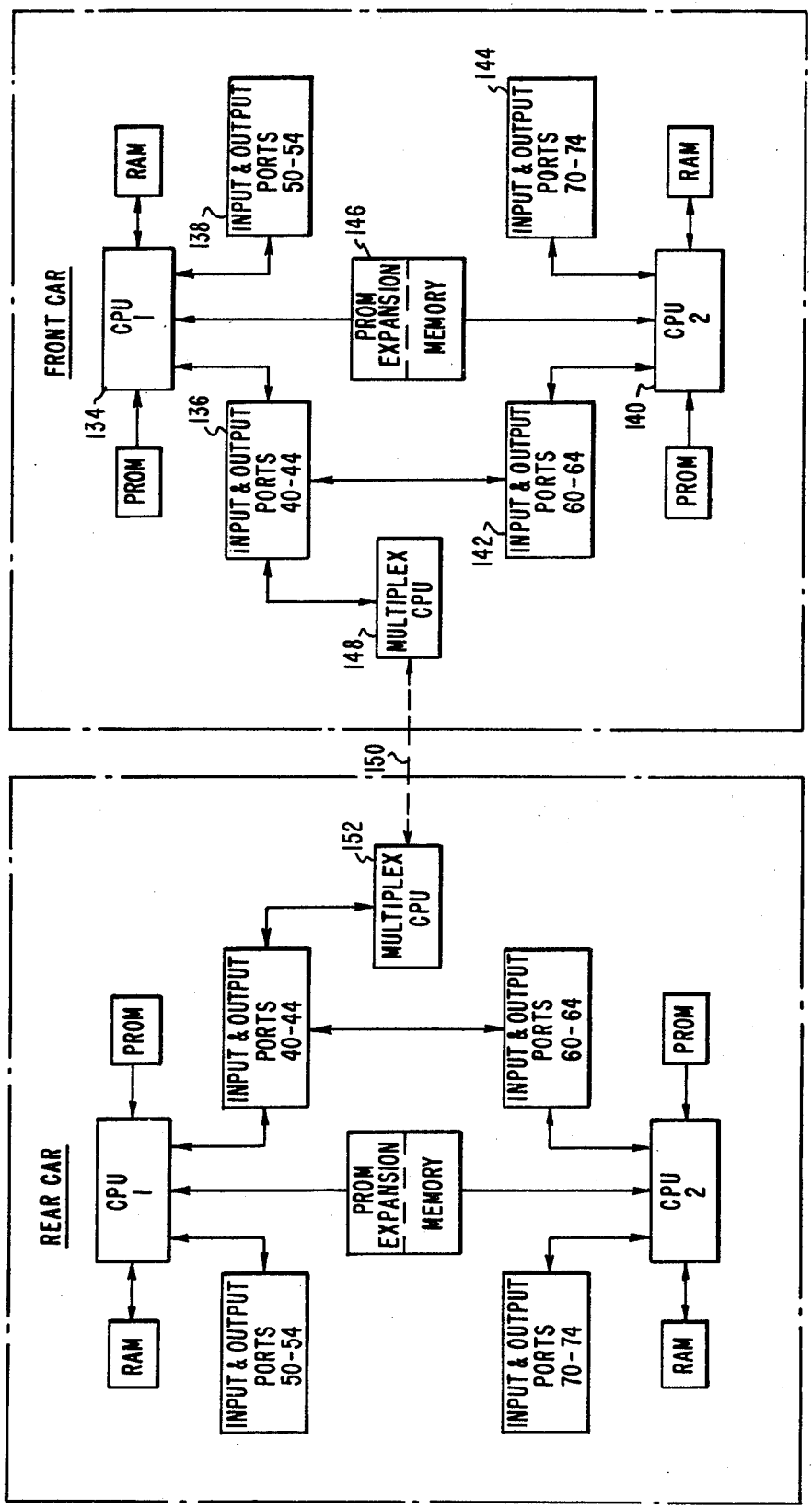
FIG. 2 illustrates the microprocessor control apparatus provided for each of the front head-end and the rear tail-end vehicle cars of a given passenger train.

In FIG. 2, the microprocessor 134 corresponds to CPU1 in the front A car 121 and in each A car of the train and operates with the input and output module ports 136 and 138. The microprocessor 140 corresponds to CPU2 in the front A car 121 and in each A car of the train, and operates with the input and output module ports 142 and 144. An expansion memory 146, which can comprise an Intel 1702 memory, operates with each of the microprocessors 134 and 140 as shown. An additional multiplex microprocessor 148 is coupled with the microprocessor 134 through the input and output ports 136 and is coupled with the well-known train line 150 going through all passenger vehicles in the train to the microprocessor 152 in the rear vehicle car of the train.

Figure 3:
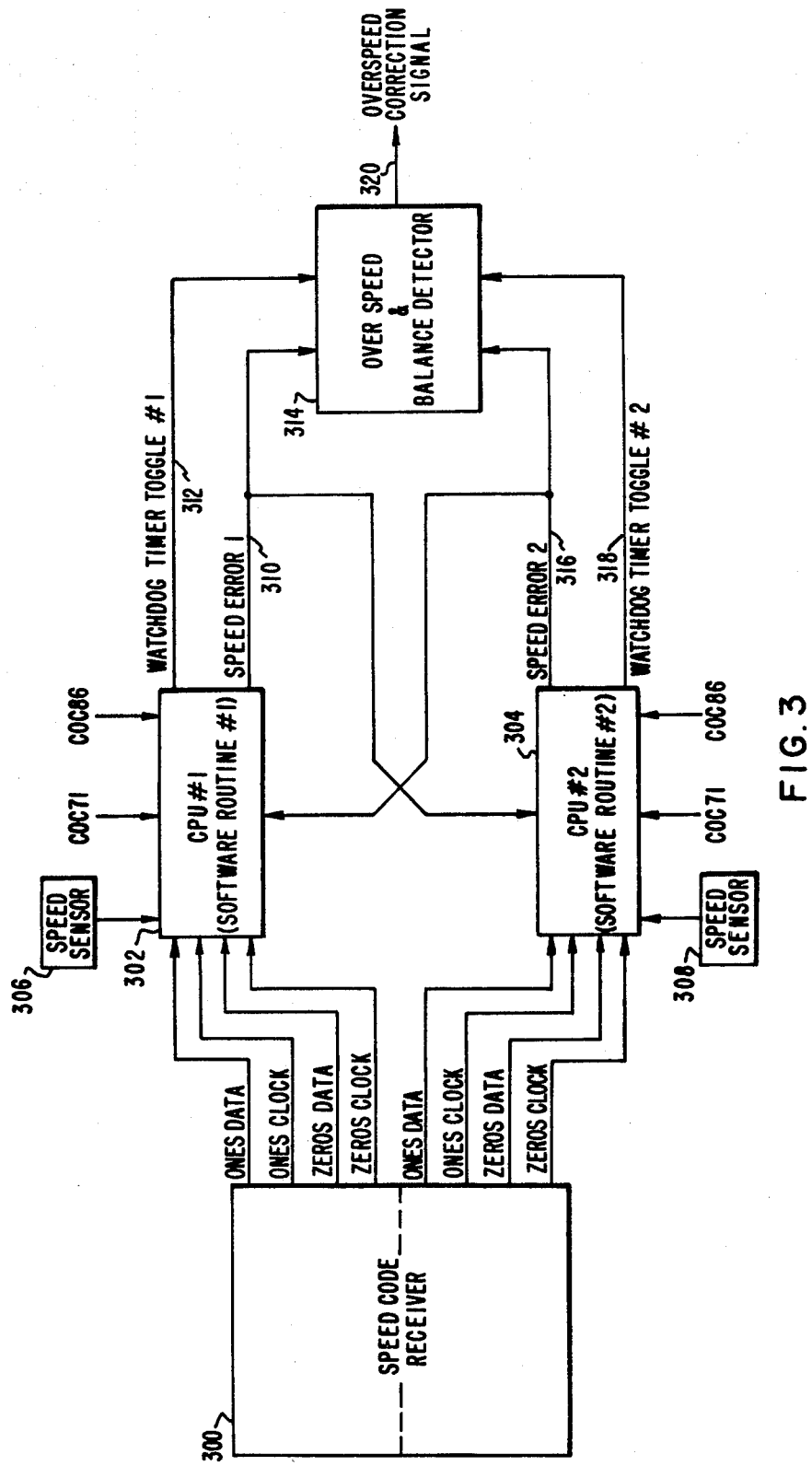
FIG. 3 functionally illustrates the desired speed code signal decoding operation including the individual microprocessors CPU1 and CPU2 with their respective input-output modules.

In FIG. 3 there is shown a functional block diagram to illustrate the speed decoding and speed error determination operation of the present invention. The desired speed code supplied to the wayside signal block in which a given vehicle is operating is sensed by the speed code receiver 300 carried on board the controlled vehicle. The speed code receiver 300 outputs the desired speed code, in terms of one's data and complimentary zero's data, along with the one's clock and the zero's clock, to each of the CPU1 computer 302 and the CPU2 computer 304 on board the vehicle. The CPU1 computer 302 responds to the actual speed output signal from a vehicle first tachometer 306 and the CPU2 computer 304 responds to the actual speed output signal from a vehicle second tachometer 308. In addition each computer responds to either of the operator provided cutout car signals COC86 or COC71 that might indicate a reduced brake system operation for the train including the vehicle carrying the computers CPU1 and CPU2. The analog speed error #1 signal on output 310 and the watchdog timer toggle #1 from the CPU1 on output 312 go to an overspeed and balance detector 314. The analog speed error #2 signal on output 316 and the watchdog toggle #2 an output 318 go to the overspeed and balance detector 314. The CPU1 computer 302 responds to the speed error #2 signal and the CPU2 computer 304 responds to the speed error #1 signal. The overspeed and balance detector 314 compares the speed error 1 signal on output 310 with the speed error 2 signal on output 316 in relation to a predetermined difference balance between those signals and to determine the provision of an overspeed correction signal on output 320.

Figure 4:
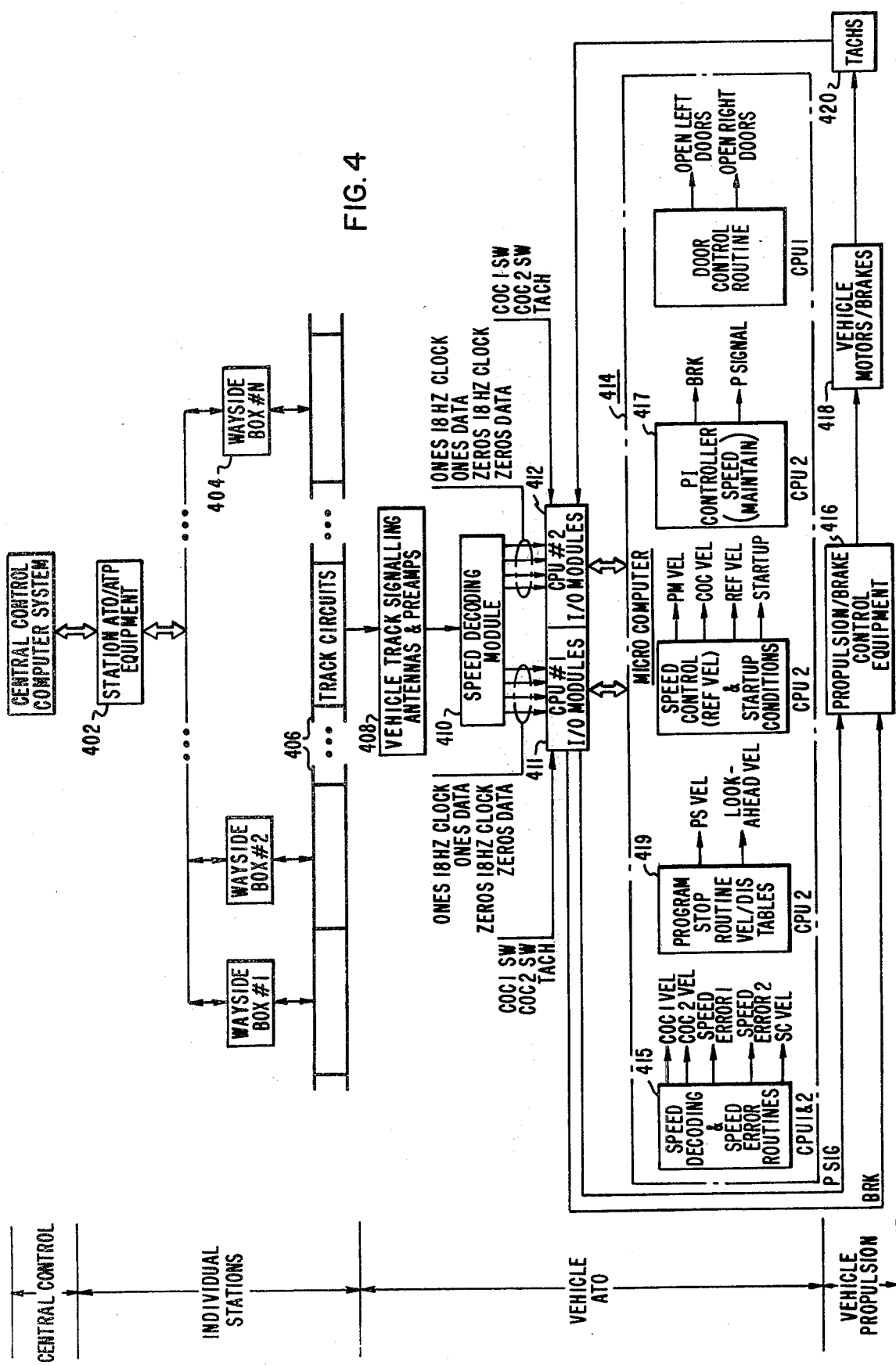
FIG. 4 shows the operational relationship of the present speed decoding and speed error program routines with the other control programs provided for the here disclosed vehicle control system.

In FIG. 4, the central control issues commands to and receives information from each of the individual stations along the line which include the ATO and ATP equipment. Each track circuit includes wayside equipment 404. The desired speed information gets to the vehicle from the station equipment 402 through the wayside box 404 into the track circuit 406 and there it is picked up on the vehicle through through the track signaling antennas and preamps 408. There are two antennas on the front and two antennas on the rear of each train, which physically receive the signal from the rail. The signal is amplified through the preamps and sent into a speed decoding module 410. The speed decoding module 410 is located on the vehicle in the train control cabinet. There are receivers, amplifiers, and other hardware to take the signals, shape them, and send the speed request information into the computer. The information signals that come from the speed decoding module 410 are listed on each side in FIG. 4. There are the ones 18 Hertz clock, ones data, zeros clock and zeros data. This information comes from the speed decoding module 410 and goes into each of the computers CPU1 and CPU2. Also going into the computers through the I/O modules 411 and 412 are the cutout car switches 1 and 2 and the tachs. Each car has two cutout car switches, which the operator can throw, but they are all train lined. If the switches on any car are throw, the information goes to the head end of the train. And if any car in the train has its switch COC1 thrown, then the total train goes to 71%, and if any car has switch CO2 thrown, the total train goes to 86%. One of the functions of the overall speed decoding system is to read these cutout car switches and read the desired speed code signal from the rail to select the safe vehicle oprating speed, so identical input signals are shown coming into CPU#1 modules 411 and CPU#2 modules 412. Block 414 is the two microprocessors CPU1 and CPU2, with the program routines involved with the speed control system, which is the speed decoding and error routine located in both CPU#1 and CPU#2. Four additional program routines shown to the right are other routines which use information from the speed decoding and speed error routine. The propulsion and brake control equipment is shown in block 416, and is controlled from the P signal and the brake signal. The car vehicle itself is shown at block 418. Block 420 are the tachometers, which sense the actual speed that the vehicle is going and feed it back into the computer CPU1 and CPU2, where a new speed error is derived.

Figure 5:
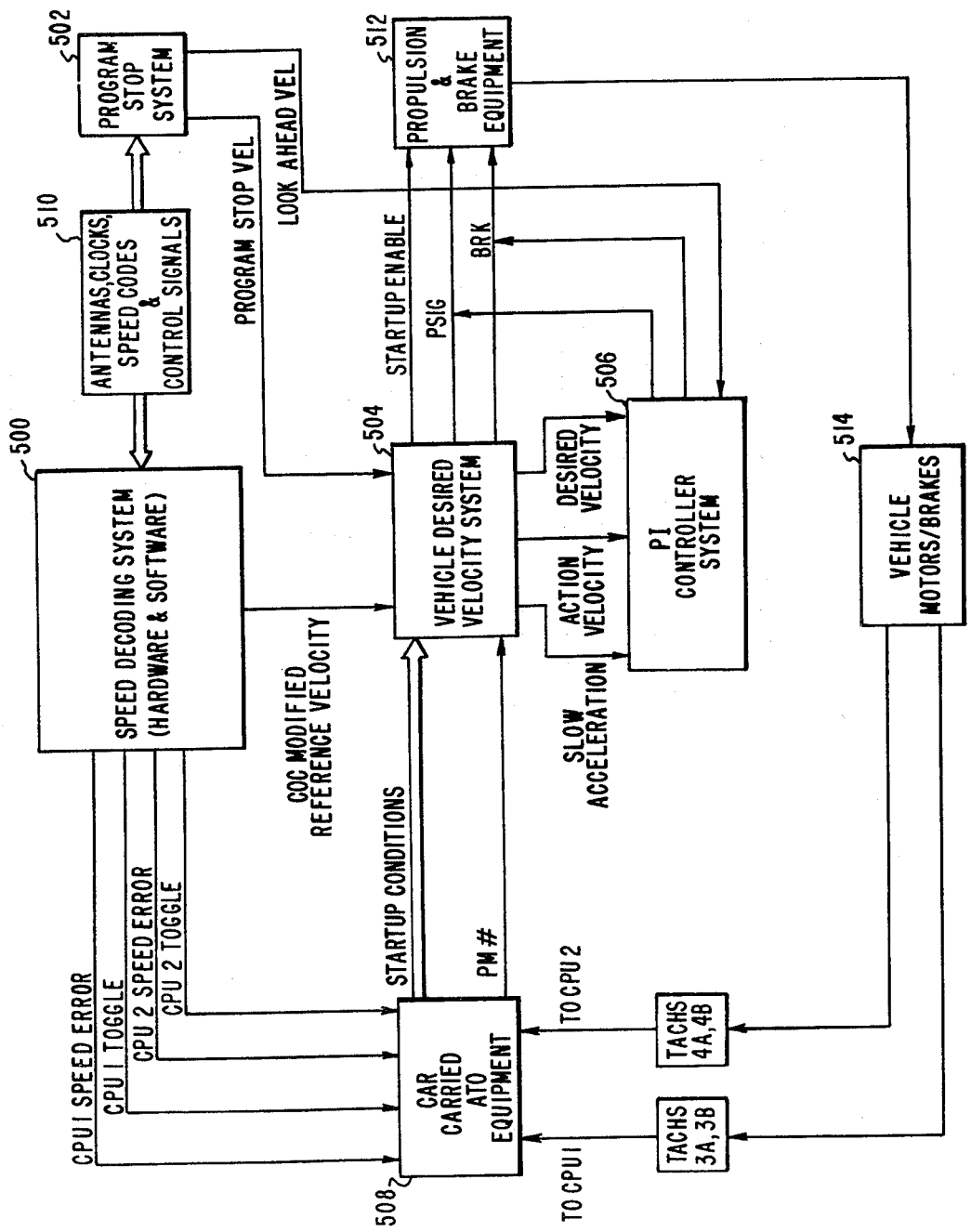
FIG. 5 shows in greater detail the operational relationship of the present speed decoding system with other control programs provided for the here disclosed control of a passenger vehicle.

In FIG. 5 there is shown the operational relationship of the speed decoding and speed error determining system 500 of the present invention in relation to the program stop system 502, the speed control and start-up conditions or vehicle desired velocity system 504 and the PI controller or speed maintaining system 506. The output signals from the speed decoding and speed error determining system 500 are the CPU1 speed error, the CPU1 toggle the CPU2 speed error and the CPU2 toggle. These output signals go to the car-carried ATO equipment 508, which also receives the actual speed signals from the tachs 3A and 3B and from the tachs 4A and 4B that are operative with the vehicle car to be controlled. The speed code signals from the wayside of the signal block within which the vehicle car is operating, and the cutout car switches 1 and 2 are supplied by the apparatus 510 to the speed decoding system 500. The car-carried ATO equipment 508 provides the start-up condition signals and the PM# signal for reduced velocity and acceleration to the vehicle desired velocity system 504, which in turn provides the slow acceleration signal, the action velocity signal and the desired velocity signal to the PI controller system 506. The vehicle desired velocity system 504 provides the start-up enable signal, the P signal and the brake signal to the propulsion and brake equipment 512, which controls the vehicle operative with the tachometers 3A, 3B, 4A and 4B.

Figure 6:
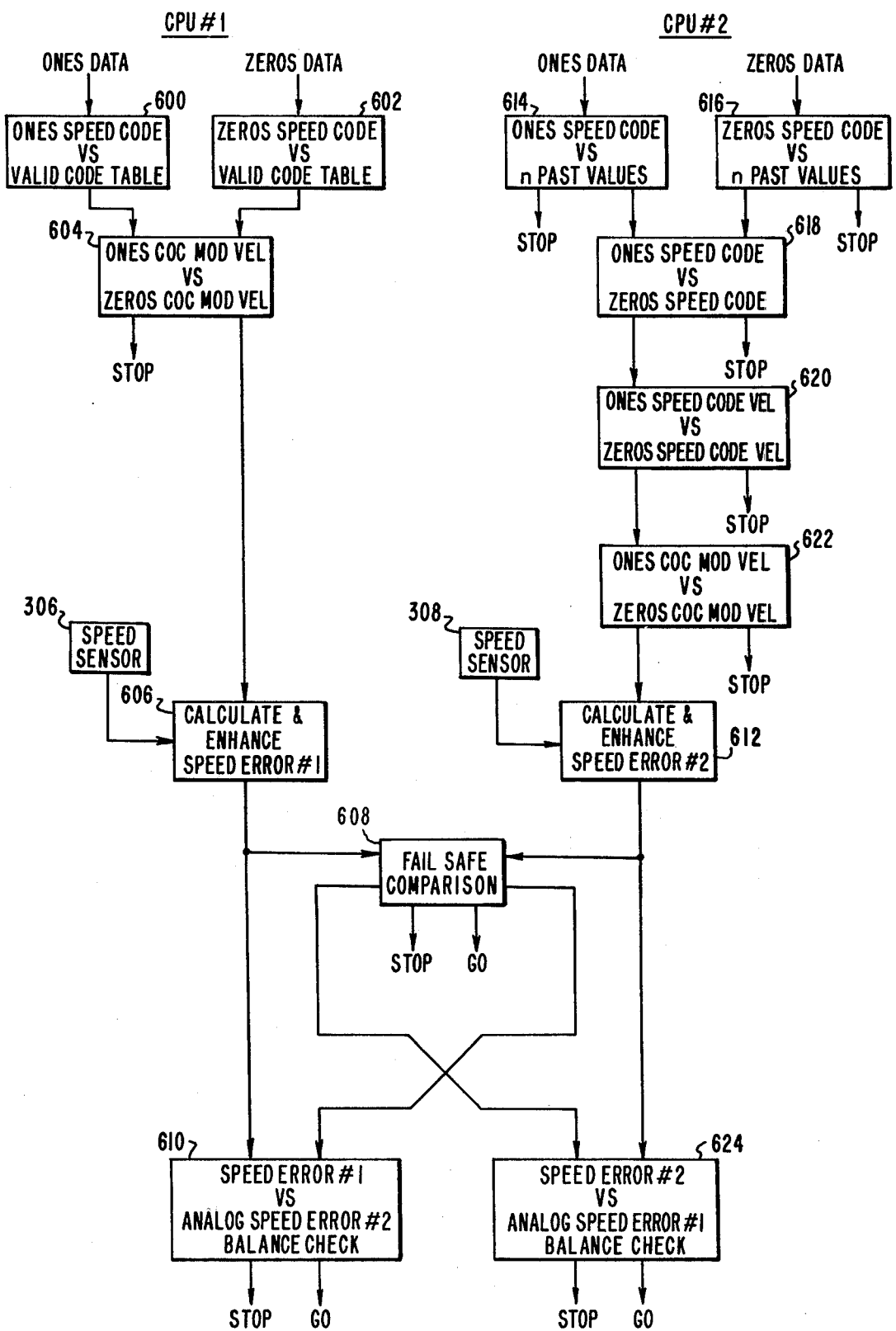
FIG. 6 is a functional block diagram of the plural different comparisons that are made for safety purposes in the operation of the speed decoding and speed error program routine.

FIG. 6 is a functional block diagram of the successive different comparisons that are made in different places in the speed decoding and error routine. At the left-hand side for CPU1, the present ones data is shown coming in and it is compared at block 600 against a table of valid speed codes. The present zeros speed code block 602 is compared with a table of valid speed codes. Block 604 compares the decoded speed from ones data with the decoded speed from zeros data. If these values are not the same the result is to stop. At block 606 the vehicle speed error is determined and enhanced, as will be explained in relation to the curve shown in FIG. 10. Block 608 is the vital checking logic apparatus, which is the hardware, and is the fail-safe logic for checking the respective speed errors from CPU1 and CPU2; on the same hardware module with this fail-safe comparison each speed error is turned into an analog signal and sent to the opposite computer, as shown in FIG. 6.

At block 610 the digital speed error calculated for CPU1 in block 606 is compared to the analog speed error calculated for CPU2 in block 612. Block 614 functions such that the ones speed code is compared bit-by-bit to a given number of past values of the ones speed code. Block 616 functions such that the zeros speed code is compared bit-by-bit with past values of the zeros speed code. Block 618 compares the six-bit ones speed code with the six-bit zeros speed code. Block 620 compares the ones speed code velocity, for example if the six-bit ones speed code was for 100 KPH, then 100 is the ones speed code velocity, is compared to the corresponding zeros speed code velocity; the speed code velocity is obtained from the tables shown in FIG. 14 as will be explained.

Block 622 functions the same as block 604, to compare the ones cutout car modified velocity versus the zeros cutout car modified velocity. Block 612 functions the same as block 606, to determine the speed error and enhance the same by fitting it to the curve shown in FIG. 10. The speed error 1 and the speed error 2 meet at block 608 for the fail-safe comparison. Speed error 2 also is sent by the analog channel over to block 610, and the speed error 1 is sent by the analog channel over to block 624, where the digital speed error 2 in CPU2 is compared with the analog speed error 1 from CPU1.

A comparison failure at any one of blocks 604, 608, 610, 614, 616, 618, 620, 622 and 624 is a signal to stop the train as shown in FIG. 6. Block 608 provides an overspeed and balance check, and blocks 610 and 624 provide balance checks to establish that the error balance is within a given tolerance. The balance here refers to speed error balance between CPU1 and CPU2.

GENERAL DESCRIPTION OF SPEED DECODING AND ERROR CALCULATION

Care has been taken to insure that the microprocessors perform the function required. Each processor receives separate inputs and clocks for the ones data and the zeros data. These inputs come from the speed code receiver module. Each processor has its own inputs from the cutout car switches, and each processor compares the speed code received on the ones channel with the speed code received on the zeros channel. These speed codes must agree or the confusion zone logic is executed. In addition, the ones and the zeros speed code inputs are compared to a given number of past values before a legitimate speed code input is recognized on each channel.

The programs for each of the microprocessors were written by different programmers working independently to insure totally different methods of performing the computations.

The confusion zone logic is required for speed code transition areas such as the boundaries between track circuits. The train vehicle must be able to cross these boundaries without momentary pauses because while in the boundaries it lacks legitimate speed commands. Time delays have been built into the programs to allow the train to proceed using the last valid speed command for a given period of time adequate to pass through a boundary, and this period of time can vary with the speed the train is moving.

A maximum time delay is determined for a given speed command. A timer is incremented or decremented based on whether a legitimate speed code is received. This timer is operated on each time the data clock causes an interrupt. Each processor has timers for its ones and zeros decoding. CPU2 timers are incremented each time a speed code is recognized on its particular channel up to the maximum time allowed. The timers are held to the maximum time as long as good speed codes are being received. The CPU1 timer is counted down and held to zero while receiving good codes. Each time a miscompare is detected the correct timer is changed by one until it reaches time out. At this time the speed command is set to zero. The following comparisons are made:

CPU#1

1. Ones speed command with zeros speed command modified for cutout car inputs.

CPU#2
1. Ones data with past values of ones data.
2. Zeros data with past values of zeros data.
3. Ones speed code with zeros speed code.
4. Ones speed command with zeros speed command modified for cutout car.

The speed error, defined as the actual speed minus the requested speed, is calculated in each computer. Different tachs are used to help insure that the actual speed used is correct. One tach failure will cause a miscompare. Each microprocessor outputs the speed error 18 times a second.

The raw speed error is enhanced by fitting it to a curve where the values close to a zero error are magnified more than for a larger error. This enables better resolution in the areas where the error is small. This enhanced value is checked for underflow and overflow and held to the limiting values.

The watchdog timer output toggle bits from each microprocessor are used to insure that the decoding and speed error routines are actually being executed. The watchdog timer is toggled right after the speed error has been output to the vital interlock module. This bit will not be toggled unless that particular section of the program is being executed. If the computer gets hung in an instruction, no interrupt will be honored and the watchdog timer will cease to toggle.

Specifications of Speed Decoding and Speed Error

Inputs
  "ONES" speed code data (Logic 1 = Speed Code 1)
  Clock for "ONES" Data
  "ZEROS" speed code data (Logic 1 = Speed code 0)
  Clock for "ZEROS" Data
  Not cut out 71%
  Not cut out 86%
  Vehicle speed from Tach.

Safety Characteristics of Inputs

"ONES" data and "ZEROS" data are independent and complementary.
An error in one of the datas will not be accompanied by a complementary error in the other data. (i.e., an addition of a one in the "ONES" data will not be accompanied by a deletion of a one in the "ZEROS" data.)
Input codes are "comma-free", (i.e., any 6 bits in order uniquely define the speed code.)
Clocks are independent and free running.

Outputs

Speed Error—8-bit data word,
  0→89 = under speed
  8A→FF = overspeed (non-vital)
Watch Dog Timer = Dynamic signal to indicate speed error is being calculated (non-vital).

Function of Program

1. Decode Speed Code (allowing for a confusion time and cutout car).
2. Read Tach.
3. Calculate speed error proportional to decoded speed—tach speed.
4. Toggle an output bit to indicate that speed error has been calculated and output.

| Speed Code (True Data) | Specifications: 100% Max.Speed | 86% Max.Speed | 71% Max.Speed | Max. Confusion Time |
|---|---|---|---|---|
| 100001 | 10 KPH | 8.5 KPH | 7 KPH | 0.9 Sec. |
| 100101 | 30 KPH | 25.5 KPH | 21 KPH | 0.9 Sec. |
| 101001 | 44 KPH | 37.5 KPH | 31 KPH | 1.9 Sec. |
| 110001 | 61.5 KPH | 53 KPH | 43 KPH | 1.9 Sec. |
| 110101 | 74 KPH | 63.5 KPH | 52 KPH | 1.9 Sec. |
| 111001 | 87 KPH | 74.5 KPH | 61 KPH | 1.9 Sec. |
| 111101 | 100 KPH | 86 KPH | 70.5 KPH | 1.9 Sec. |

Figure 11:
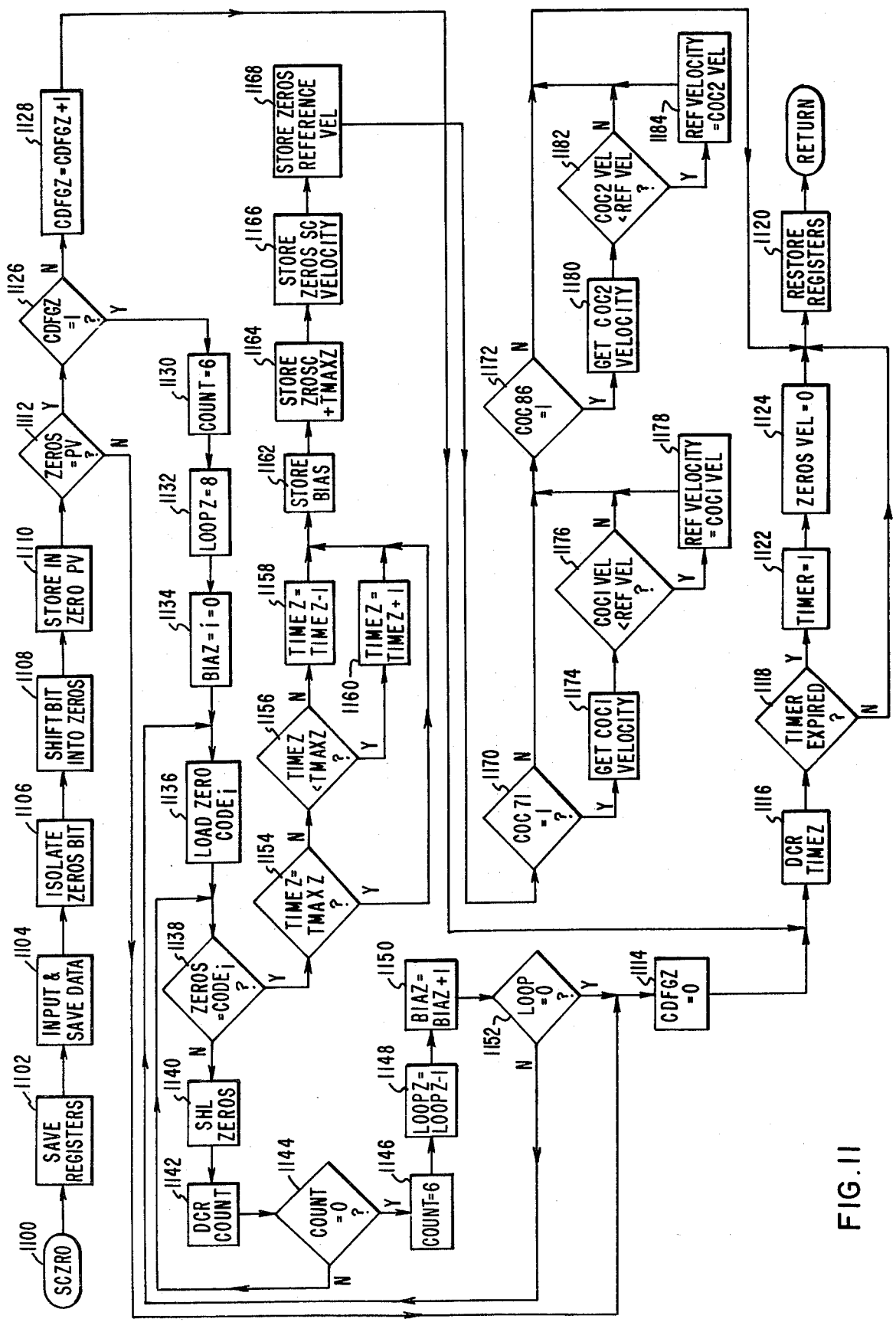
FIG. 11 illustrates the zeros speed code data decoding program of a second programmer.
Figure 12:
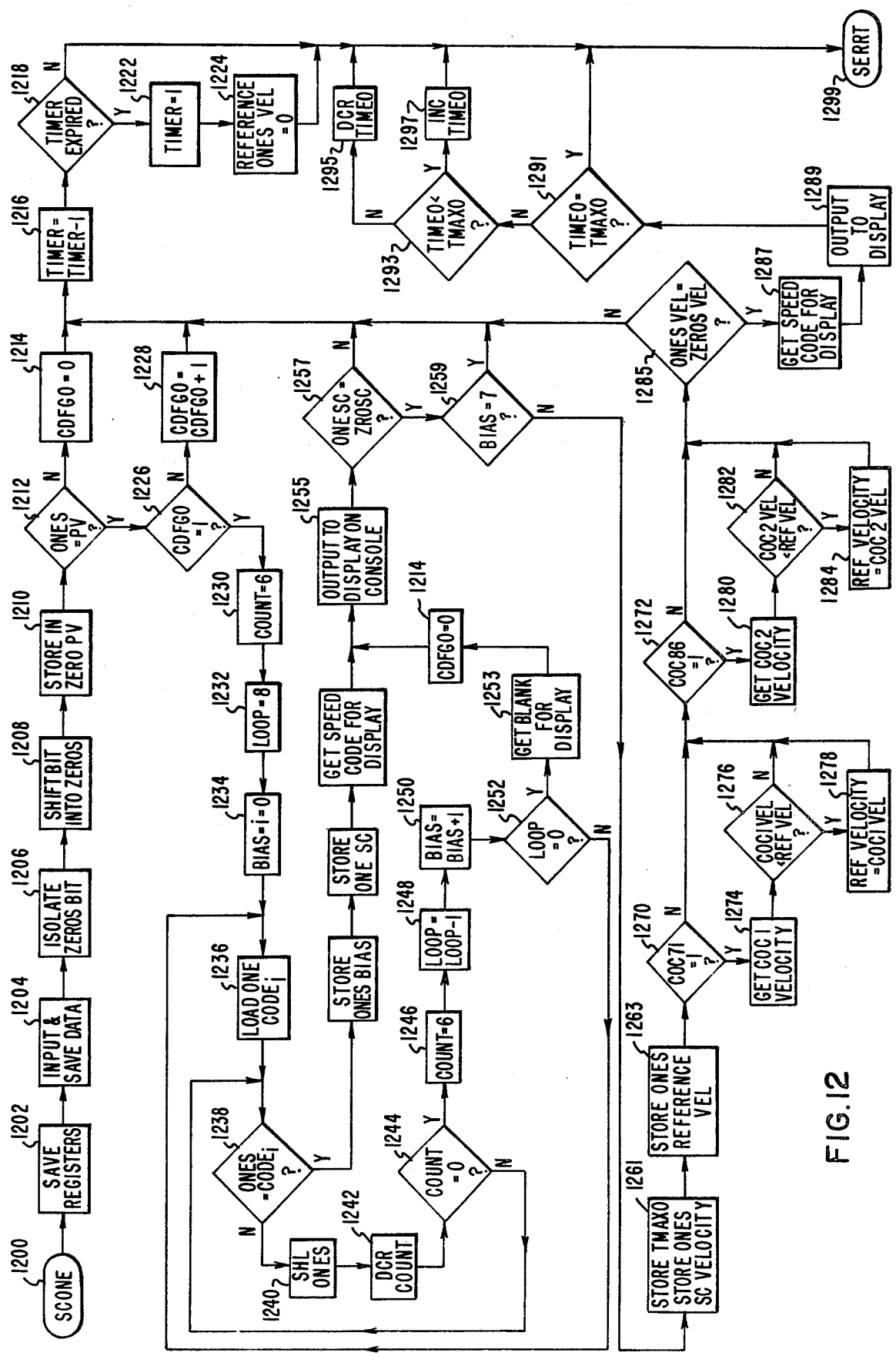
FIG. 12 illustrates the ones speed code data decoding program of said second programmer.
Figure 13:
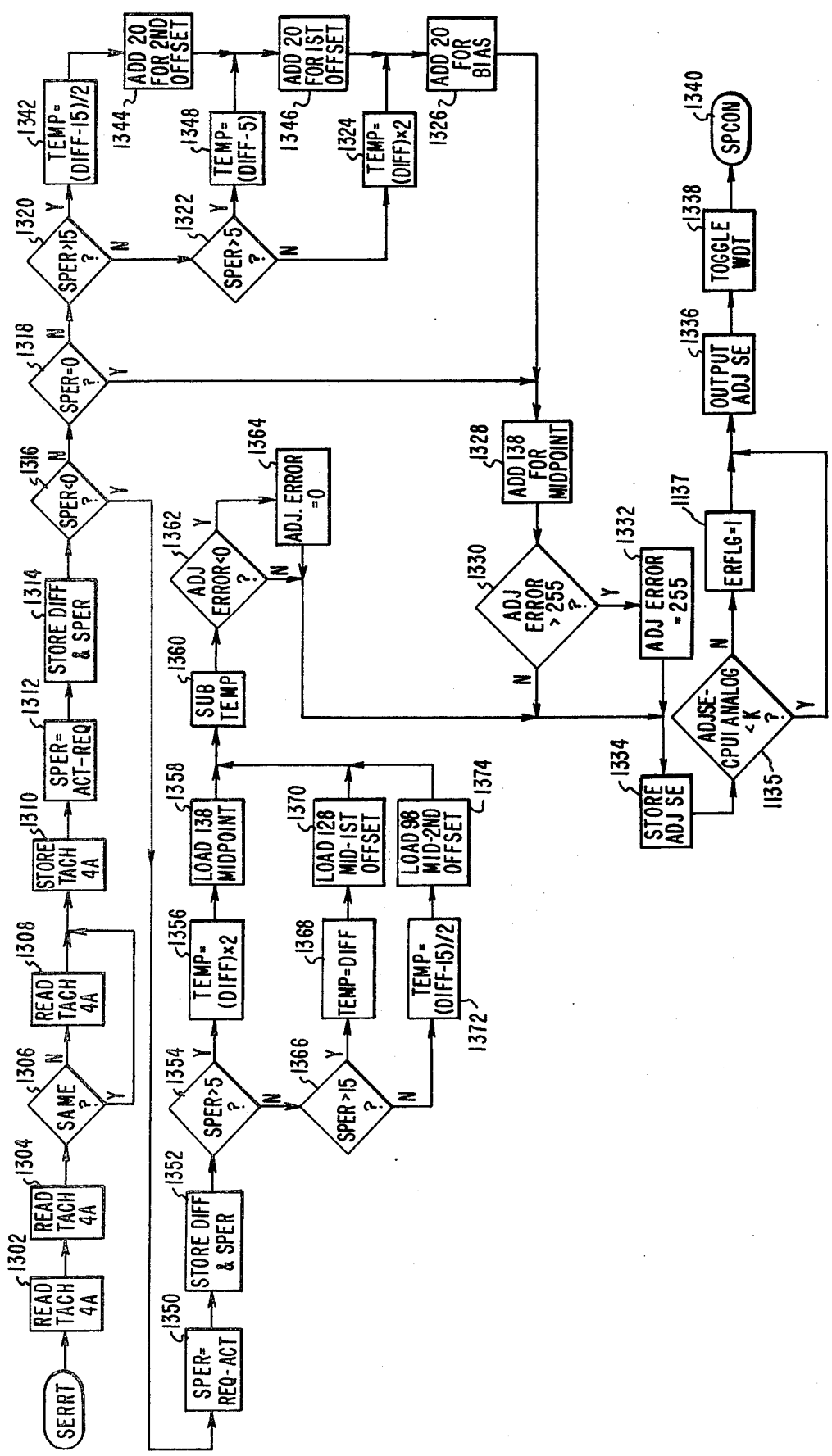
FIG. 13 illustrates the speed error determination program of the second programmer.

Speed Error:
  4 Bits/$\Delta$KPH    If $|\Delta KPH| < 5$
  2 Bits/$\Delta$KPH    If $5 \leq |\Delta KPH| < 15$
  1 Bit/$\Delta$KPH     If $15 \leq |\Delta KPH|$
  Centered on 138 (mid-scale)
  Offset of + 20 bits if tach $\geq$ maximum speed Description of Speed Decoding and Speed Error Determination in CPU2 by Program Routines Shown in FIGS. 11, 12 and 13

The program for speed decoding and error calculation in CPU#2 has three sections, zeros decoding, ones decoding, and error determination. The zeros decoding subroutine is called by the zeros 18 Hz clock interrupt. This subroutine operates independently from all other routines in the program. The ones decoding subroutine is called by the ones 18 Hz clock interrupt. Information stored by the zeros decoding routine is used for comparisons. The speed error routine is entered from the ones decoding subroutine.

Zeros Decoding #2

The zeros speed decoding subroutine is entered 18 times a second using the zeros data 18 Hz clock for an interrupt. As soon as the routine is entered the registers are stored and the interrupts are enabled to allow other interrupts to be honored if they occur.

In relation to the programs shown in FIGS. 11, 12 and 13, each speed code data bit is input and shifted into a six-bit shift register located in memory. This six-bit code is compared to the previous 6-bit code (past value) to see if the code is the same. If the two codes are different, the good code counter is set to zero and control transferred to the confusion zone section of the program. If the present code and the past value code are the same, the good code counter is checked for a desired number of identical codes received. If the desired number of sequential codes has not been reached, the counter is increased by one and program control is transferred to the confusion zone logic.

When the desired number of identical sequential codes is reached the speed code table is searched to determine whether the code being received is a legitimate speed code. If the code is not a legal speed code, the good code counter is set to zero and program control transferred to the confusion zone logic. If a legal speed code is being received, the zeros confusion zone timer is checked against the zeros confusion zone maximum timer value. The zeros timer is increased or decreased by one until the maximum time value is reached.

When the speed code table was searched and a legal speed code is found, the relative position or table bias is stored in memory. PROM memory contains five tables pertaining to zeros speed decoding. Each of these tables contains eight entries, one for each of the eight speed codes.

1. The speed code table contains the six-bit comma-free code for each of the eight different speeds.
2. The speed command velocity table contains the speed times two for each speed code.
3. The COC1 velocity table contains 71% of the speed times two for each speed code.
4. The COC2 velocity table contains 86% of the speed times two for each speed code.
5. The confusion zone times table contains the maximum confusion zone time for each speed code.

Using the table bias counter the zeros speed code, zeros speed command velocity and zeros confusion zone max. time are stored in working memory. Zeros reference velocity is set equal to zeros speed command velocity. The COC71 switch is checked. If the switch is on, the zeros velocity is set equal to the COC1 velocity.

The COC86 switch is checked. If the switch is on, the zeros reference velocity is set equal to the COC2 velocity if COC1 is not already set. The registers are restored and the routine is exited. At this point in time the zeros reference velocity is equal to the lower of the speed command velocity, COC1 velocity or COC2 velocity.

In the cases where control is transferred to the confusion zone logic a check is made whether to set the reference velocity to zero or leave it unchanged. When a legal speed code is received, its associated confusion zone maximum timer is set. This is the time the train is allowed to move through a confusion zone before setting the reference velocity to zero. Each time the program passes through the confusion zone logic the timer is decreased by one count. When the timer reaches zero the reference velocity is set to zero. As long as the timer has not expired the reference velocity is not changed.

Each time a good code is received the timer is increased, up to its maximum value. This requires several good codes to be received before the confusion zone timer reaches its maximum value.

The output of the zeros decoding routine is either a cutout car modified speed command velocity or zero in the case the confusion zone timer has expired. This value is stored in the zeros reference velocity location in memory. It is used in the ones decoding routine for comparison purposes. The decoded speed code is also stored for comparison.

Ones Decoding #2

The ones decoding routine is entered 18 times a second using the ones data 18 Hz clock for an interrupt. This subroutine does everything that the zeros decoding routine does and in addition makes comparisons between the ones decoded speed code and the zeros decode speed code. It makes a comparison of the ones COC modified speed command velocity (ones reference velocity) and the zeros COC modified speed command velocity (zeros reference velocity). In addition this routine controls the cab signal display. It also compares its speed error with the analog speed error from CPU1.

If either the ones speed code and the zeros speed code or the ones reference velocity and the zeros reference velocity fail to compare, program control is transferred to the ones confusion zone logic.

At the conclusion of this routine a reference velocity that has passed the comparison test or is zero has been attained. It has been attained by two separate routines operating with two different inputs which are the complement of each other. This reference velocity is now used to calculate the speed error, enhance the error by fitting it to a curve, and send the resulting value to the vital interlock module.

The speed error routine in CPU#2 is entered from the ones decoding routine. A valid reading is made from the tach. The speed error is the actual speed minus the requested speed. The speed error is grouped as follows: less than 15 KPH, 15 KPH-5 KPH, 5 KPH-0 under speed and greater than 15 KPH, 15 KPH-5 KPH, and 5 KPH-0.5 KPH overspeed. Each group is modifed by a given amount and limits checked for maximum and minimum values.

The resulting enhanced speed error is stored in memory and output to the fail-safe comparison logic. It is compared with the analog speed error from CPU1. After the speed error has been output, a watchdog timer bit is toggled. This toggling has been placed as close as possible to the speed error output to insure that each time a speed error is output the toggle bit is exercised. The 9 Hz square wave output is used for dynamic action in the fail-safe comparison logic. This enhanced speed error is compared with the enhanced speed error from CPU#1 on the vital interlock module. The errors must compare and both watchdog timer bits must be toggling before the system is allowed to respond to a speed command.

Tables

| | |
|---|---|
| SCTBO | ones speed code table |
| SCVLO | ones velocity table |
| C71VO | ones 71% cutout car velocity table |
| C86VO | ones 86% cutout car velocity table |
| CTIMO | ones confusion zone timer table |
| SCTBZ | zeros speed code table |
| SCVLZ | zeros velocity table |
| C71VZ | zeros 71% cutout car velocity table |
| C86VZ | zeros 86% cutout car velocity table |
| CTIMZ | zeros confusion zone timer table |
| SPEED | speed code to console display table |
| ONES | shift register for ones data |
| ONEPV | past value for ones data |
| ONESC | ones speed code |
| OVLSC | ones speed code velocity |
| OVLRE | ones reference velocity |
| CDFGO | good code received, ones |
| TMAXO | max time for confusion zone, ones |
| TIMEO | ones timer |
| SCBIS | ones speed code table bias |
| ZEROS | shift register for zeros data |
| ZROPV | past value for zeros data |
| ZROSC | zeros speed code |
| ZVLSC | zeros speed code velocity |
| ZVLRF | zeros reference velocity |
| CDFGZ | good code received, zeros |
| TMAXZ | max time for confusion zone, zeros |
| TIMEZ | zeros timer |
| SCTIZ | zeros speed code table bias |
| VELSC | speed command velocity |
| VELPM | PM velocity |
| VELPS | program stop velocity |
| VERLRF | reference velocity |
| VELAC | action velocity, goes to speed maintaining |
| VELRE | PM number |
| PMBIS | PM table bias |
| ACCPM | PM slow acceleration |
| PSIG | P signal request |
| SPER | speed error, raw |
| OVER | overspeed, raw |
| UNDER | under speed, raw |
| IN51 | all door closed input word |
| IN72 | TACH 4A input word |
| IN73 | ones + zeros data input word |
| OUT61 | enable, BRK, WDT output word |
| OUT64 | analog output word |
| OUT70 | speed error output word |
| OUT71 | console lights output word |

DETAILED DESCRIPTION OF SPEED DECODING AND ERROR CALCULATION

Figure 8:
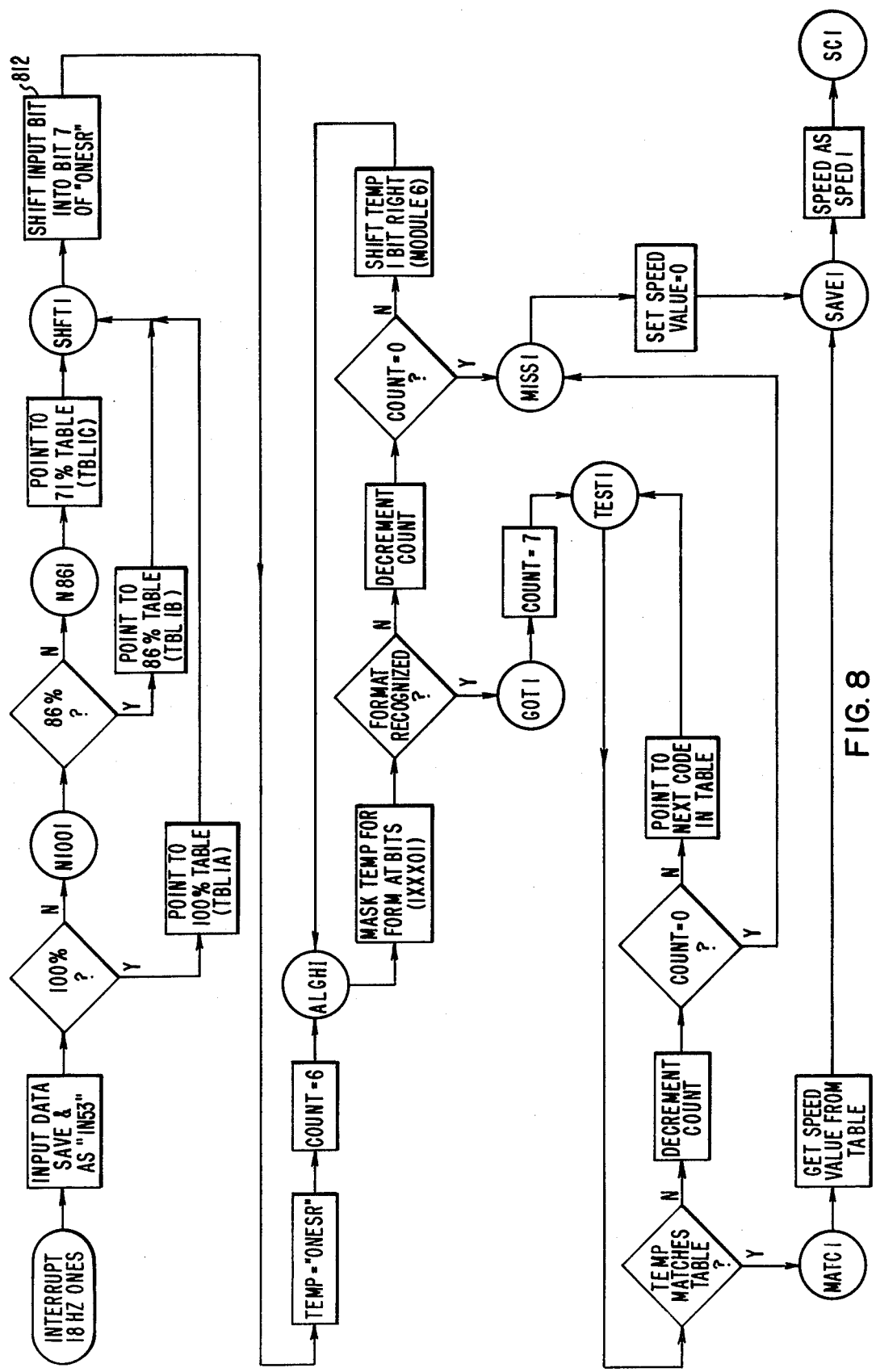
FIG. 8 illustrates the ones speed code data decoding program of said first programmer.
Figure 9:
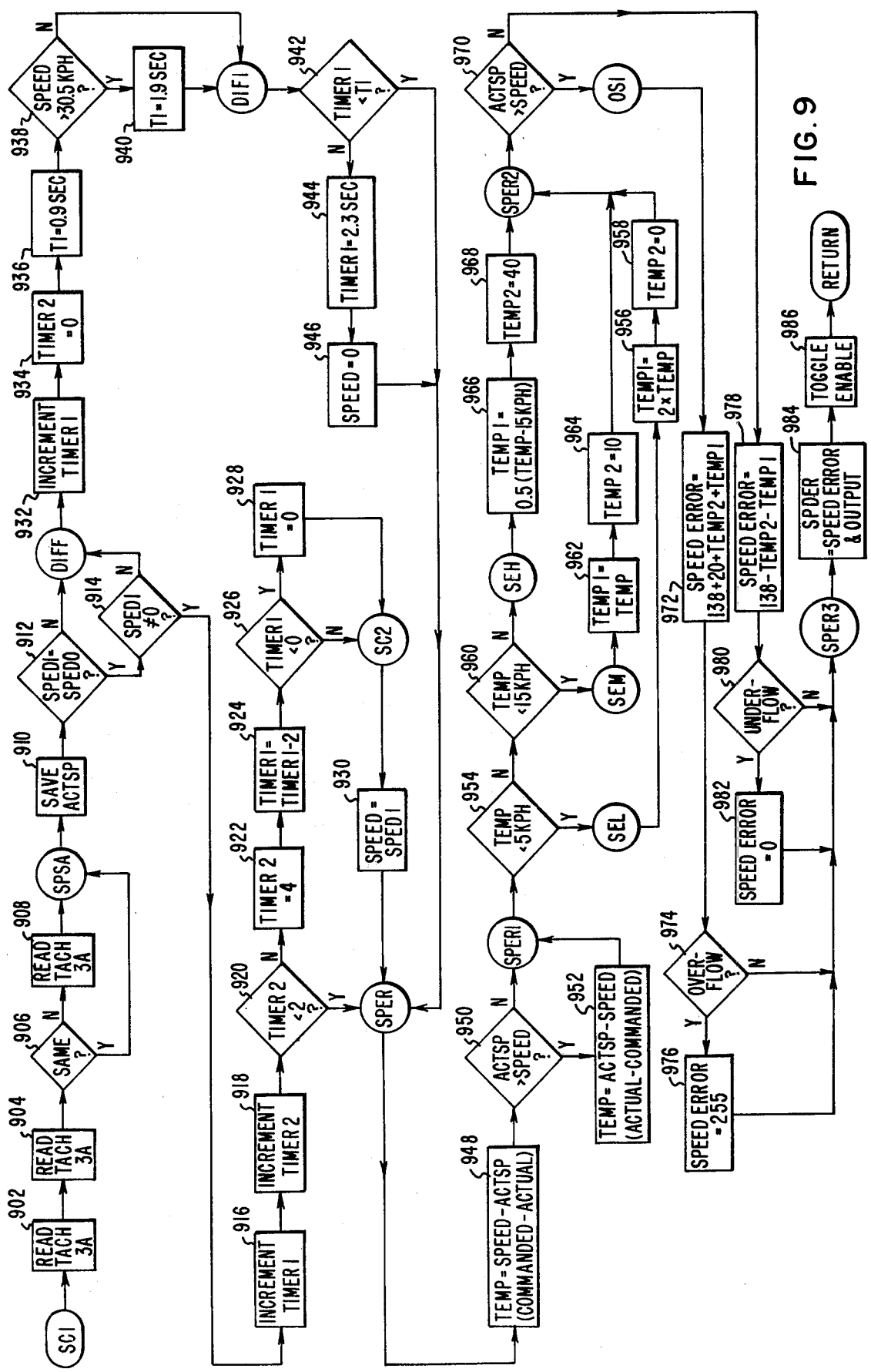
FIG. 9 illustrates the speed error determination program of the first programmer.

The speed decoding and speed error determination program routines of a first programmer are shown in FIGS. 7, 8 and 9.

In FIG. 7 there is shown a zeros data decoding which starts with the 18 hertz zeros clock interrupt and enters this program routine; CPU1 stops what is was doing before and does this routine shown in FIG. 7. Step 700 is read and saves the data because that data is going to be changing so it should be read and held. At step 702 a check is made to see if there are no cutout car inputs such that at step 704 the TABLE TBLOA shown in FIG. 15 is selected, and if there are cutout car inputs at step 706 a check is made to see if it is COC 86% in which case at step 708 the TABLE TBLOB is selected and if there are no cutout car inputs at step 710, the TABLE TBLOC is selected for the actual decoding of the speed codes, and the steps 704, 708 and 710 are just pointing to the first value in one of those tables. At step 712 the latest bit of data is shifted into a shift register ZRSRO, and step 714 is shifting the previously received bits of data over by one; there are two shift registers, where one is essentially just an extension of the other one so this sets up the operation to be looking at data one bit old and looking at the first six of the last seven bits received. Since the beginning or end of these six bits of data is not known, and the first bit is probably not the first bit of a speed code, step 716 puts this six bits of code into a temporary register to permit rotating it around to get it lined up so that the first bit is the first bit of the speed code and the last bit is the last bit of the speed code. Step 718 sets a count to six because up to six shifts might be required to establish that the data is aligned, and if it is not properly aligned within six shifts, then it is not a valid speed code. Step 720 masks off the bits in this temporary register looking for format bits since again the proper speed codes all have a leading bit that is a one, the next to the last bit is a zero and the last bit is a one, and no matter how those codes are rotated around, that will only be true if the code is lined up properly as is characteristic of a comma-free code. Or if a transition is made from one code to another code, no matter where that transition occurs it will only be a valid code if it meets this format. Step 722 checks to see if there is a proper format. If not, step 724 decrements this count. If this count gets to zero at step 726, this means the data was rotated around six times without finding a proper format. Therefore, the program goes to the label MISSO, and at step 728 sets the decoded value to zero because it was not a valid speed code and at step 730 saves that speed as the variable called SPEDO for speed zero because it is the speed value decoded from the zeros data. At step 726 if that count is not zero, a shift is made at step 732 which is just rotating it around so that what was the last bit now becomes the first bit, what was the first becomes the second and so on. Step 720 again masks off looking for the format bits and step 722 sees if there is a proper format, and if there is not, the program goes around the loop again up to six times. If step 722 does see a proper format, the program goes to 1 bel GOTO, and at step 734 sets a count to seven because once a proper format is found there are eight possible combinations of codes which can do that and only seven of which are valid speed codes. There are seven entries in the table shown in FIG. 15 and it is desired to compare this speed code against the table entries. The counter at 734 is used to determine when all 7 have been looked at. The six-bit speed code, which is now lined up, is matched at step 736 against the first entry in the table. Back at steps 702 to 710 the appropriate table was selected at the start of that appropriate table, so if a match is not found with that speed code, at step 738 the count is decremented.

Step 740 checks to see if the count reads zero, and if it is, this means all seven entries have been looked at without finding a match, so step 728 again sets the speed to zero because it was not a valid speed code. If the count is not zero at step 740, at step 742 the next entry in the table is selected which is actually two levels down in the table since the tables are set up with the speed code followed by its decoded decimal value, then the next speed code and its decoded value and so forth. So step 742 actually increases the table pointer by two, and goes back to step 736 for another comparison. If a match is still not found, the program goes around the loop again. If a match is found, and a valid speed code is now obtained at step 736, then at step 744 the value is taken out of the table which is the decoded value for that speed code. The program goes to step 730 and saves that value as speed zero to provide a decoded value for the speed code based on the zeros data with whatever cutout car information was present.

In FIG. 8, there is shown a similar program routine flow chart for decoding the speed code from the ones data. The 18 hertz ones clock interrupt starts the operation, and everything is the same except after step 812 the second shift register step is not included. For the ones data the program is looking at the last six bits of data received. The same type of decoding is provided as described for the zeros data. The table values in the ones decoding represent true data, such that a one is a one and a zero is a zero. In the zeros table, a logical zero is a physical one because the input data to that operation was the complement. When the program operation is done, the ones speed error is the result of the decoding of the ones data.

The programs of FIGS. 7 and 8 are doing the speed decoding non-vitally, and doing it twice in each of two computers CPU1 and CPU2, with two different sets of hardware for the two computers, such that actually the decoding occurs four times. The prior art practice was decoding the speed once but it was done with a vital decoder, such that either the right speed code was determined or the result was zero.

In FIG. 9 there is shown the program routine for comparing the actual speed with the desired speed to establish the vehicle speed error. Steps 902, 904, 906 and 908 provide successive input readings of the vehicle tach actual speed signal, since there may occur a time period where that data is being updated and thus may be changing, so if the data is read at exactly that changing time, erroneous data might result. This could be true for all eight bits. To avoid this problem the speed data is read twice and compared to see if they are the same; otherwise if they are different, another reading is made immediately and it is known that another change transition has not occured within this time.

At step 910 the speed input is saved as a variable called ACTSP for actual speed, and this is the actual train vehicle speed in the computer. Step 912 compares speed one and speed zero from the previous two independent decoder operations. If they are the same, at step 914 a check is made to see if speed one is not zero. If speed one is not zero, this indicates that one is a valid speed code. At steps 916 and 918 two timers are incremented. Step 920 checks to see if timer 2 is greater than 2. If timer 2 is greater than 2, this indicates a valid non-zero speed decoding. If the timer 2 is less than 2, then it is desirable to leave the variable called SPEED the same as whatever it was before, since the operation is in a transition period. On the other hand if it has been seen that more than two times in a row, with valid decoding more than twice in a row, then at step 922 timer 2 is limited to 4 to keep timer 2 within bounds, otherwise since timer 2 is incremented every time, if it is not limited it is going to overflow.

Step 924 decrements timer 1, which is the confusion zone timer. If valid decoding is obtained, it is not desired to reset that timer but instead to bring it back down towards zero, so making timer 1 equal to timer 1 minus 2, increment it by 1 and then decrement it by 2, and the net effect of coming through this path is timer 1 is one less than what it was the last time. Step 926 checks to see if timer 1 is trying to go below zero, and if it is then at step 928 it is held to zero to keep timer 1 within bounds and do not let it underflow. At this time there has been valid decoding, and it has occurred two or more times in a row, so at step 930 SPEED, which is the variable used for the maximum speed allowed, is set equal to SPED1 which of course is equal to SPED0, otherwise the program would not have gotten through this path.

Back at steps 912 and 914 if the speeds are not equal or if they are equal to each other and equal to zero, the program goes to the confusion zone area which was labeled DIFF, for different, and at step 932 timer 1 is incremented which is the confusion zone timer. Step 934 sets timer 2 to be zero anytime a miss comparison or a zero result is obtained. The timer 1 is the confusion zone timer and the timer 2 is the valid timer. Step 936 sets T1 equal to 0.9 seconds. At step 938 a check is made to see if the last speed code received was higher than a thirty KPH code; if it was higher than a thirty KPH code, then step 940 sets T1 to 1.9 seconds. If SPEED is less than 30 at step 938 then T1 is left at 0.9 seconds, so now T1 is the maximum time for the confusion zone timer. Step 942 compares timer 1 which is the confusion zone timer with T1, and if it is less than T1, the confusion zone time has not elapsed and the SPEED variable is not changed. If timer 1 is equal to or greater than the maximum time T1, then at step 944 timer 1 is set equal to 2.3 seconds to hold it to a known value. At step 946 if the timer 1 is greater than the maximum allowed value of T1, SPEED is set equal to zero, with SPEED being the variable that is the result of the provided decoding. At step 948, the speed error which is the label SPEED has the tach reading ACTSP subtracted from it. At step 950 a check is made to see if the actual speed is greater than the commanded speed to indicate the vehicle is going too fast. If the vehicle is going too fast, then instead of using speed minus actual speed, step 952 finds actual speed minus SPEED. Steps 948, 950 and 952 are getting the absolute value of the difference between the two speeds so the program is always working with a positive number. At step 954 a check is made to see if the magnitude of the speed difference is less than 5 KPH; if it is, then step 956 sets the gain to be 4 bits per delta KPH difference and step 958 gives the offset. If the speed difference is not less than 5 KPH at step 954, then at step 960 a check is made to see if it's less than 15 KPH; if it is, then step 962 sets the gain to be two bits per KPH and temp 2 at step 964 is the desired offset.

The offsets are added to provide a continuous function. If the speed difference is not less than 15 KPH at step 960, then step 966 sets it to 1 bit per KPH and again the temp 2 at step 968 is the offset to get a continuous curve. At step 970 a check is made to see if the vehicle is going too fast or too slow because now the magnitude of the speed error is known but not the sign of that speed error, since the program was working with absolute values of the speed error, it is now necessary to get it back to normal. If the vehicle is going too fast, at step 972 the speed error is set equal to 138 plus 20, where 20 is the additional offset for being in overspeed, plus TEMP 2 plus TEMP 1; this sets the midpoint of the curve and builds the value of the midpoint. It is desired that the speed error not overflow and actually hit saturation on this speed error because of this offset, which can result in an overflow of the available 8 bits of binary information.

The step 974 checks to see if an overflow is present, and if so step 976 limits the speed error value to a maximum of 255. At step 970, if the actual speed is less than desired speed, this is underspeed and step 978 sets the speed error to 138 minus TEMP 2 minus TEMP 1, which are the values for the other half of the curve. Just in case this value should ever go below zero, an underflow test provided at step 980 to check if it tries to go below zero, and if the result of this determination tries to go below zero, at step 982 the speed error is held to zero. The speed error is output at step 984, and immediately after that, step 986 toggles the watchdog timer, and the program operation is done.

Figure 10:
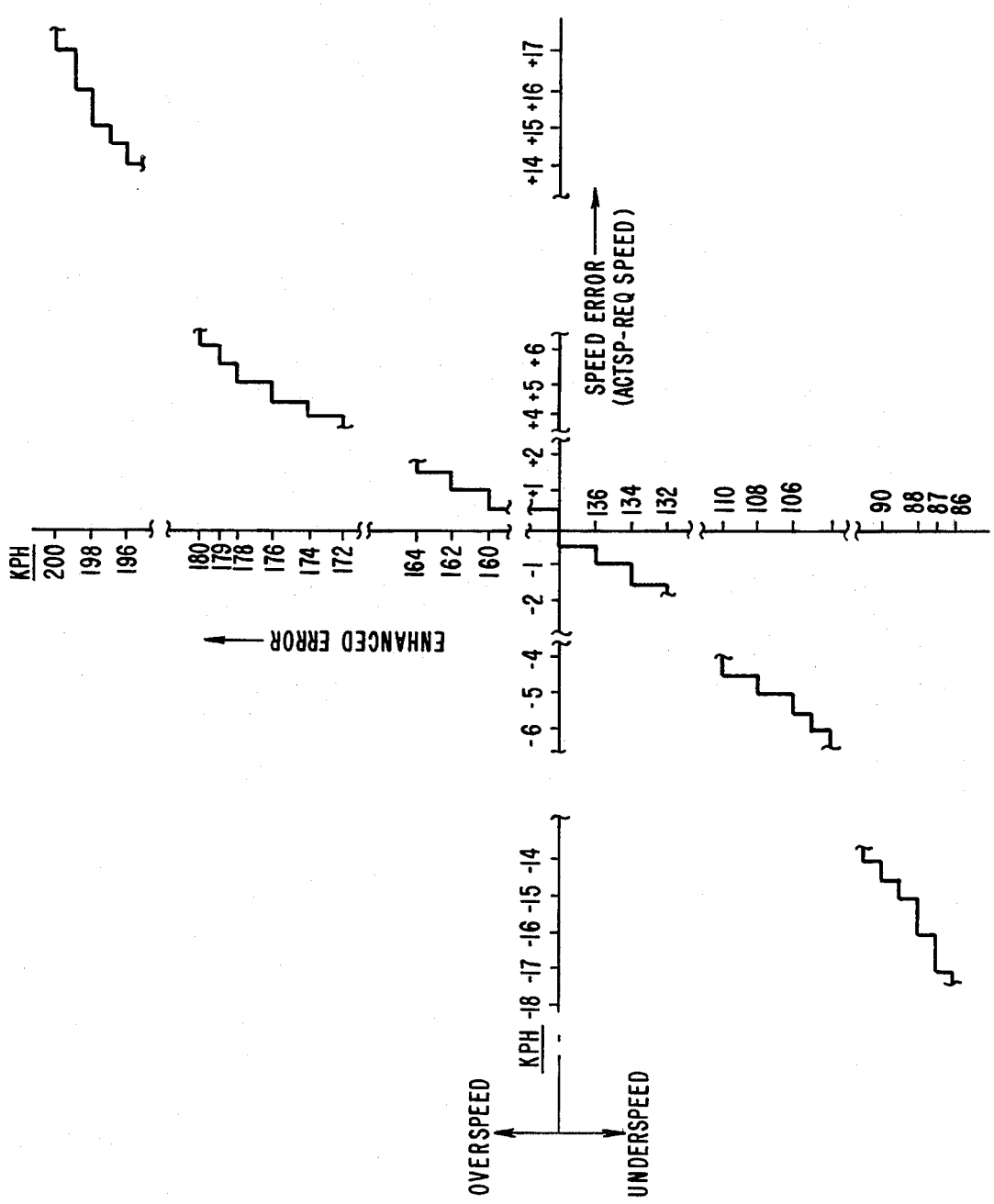
FIG. 10 shows the speed error curve employed to enhance the raw speed error to enable better resolution of the actual speed error in relation to particularly the smaller speed errors.

FIG. 10 shows the enhanced speed error plotted versus actual speed, in accordance with the previously described operation of the speed decoding and speed error determining program routines shown in FIGS. 7, 8 and 9. The provided offsets effecting an enhancement of the determined speed error are shown, such that a speed error close to a zero speed error is magnified more than a larger error to permit better resolution where the speed error is smaller. The speed decoding and speed error determination routines of a second programmer are shown in FIGS. 11, 12 and 13. There are three routines in this program. The first is the zeros decoding, the second program is the ones decoding, and the third program is the speed error determination. In the first program shown in FIG. 11 the entrance step 1100 is entered 18 times a second based on the zeros data clock signal shown in FIG. 3. At step 1102, the information in all working registers is stored, and when leaving the routine these are picked up and restored before an exit is made to the main speed control program. Step 1104 simply inputs the new data bit and stores it. Step 1106 isolates the zeros bit to mask out the data and determine if it was a one or it was a zero. Step 1108 shifts the bit into the zeros shift register, which is a six-bit shift register. At step 1100 the last value is stored in the past value, such that every time a new bit is received, it is stored as a new six-bit code and the last six-bit code is moved into the past value table. Step 1112 compares the present six-bit data with the past six-bit data and checks to see if they are identical. If they are not, the operation goes to the confusion zone area since if the two successive 6 bit codes are different, this indicates either a noise problem or a transition signal block zone and it's not a good input speed. There is a flag called CDFGO. In step 1114 that is set to zero because an agreement did not occur and the program goes to the confusion zone. In the confusion zone, at step 1116 the confusion zone timer is decremented. Step 1118 asks if the timer has expired. If the answer is no, at step 1120 the registers are restored and an exit is made from the routine. If the timer hasn't expired at step 1118, this indicates the operation is still in the legal transition period from one speed code to another, which time is obtained from the table 1414 in FIG. 14 which is the confusion zone timer table. For example, if the vehicle is going 100 KPH it is allowed 1.8 seconds to make the transition from one speed code boundary to another; the program operates to take the 1.8 and multiplies it by 18 and that is the time that is stored in the table 1414. So if the timer has not expired, the output speed command is not changed, and the program at step 1120 restores the registers and leaves. The other situation at step 1118 is when the timer has expired or counted down to zero, and if it has expired, the timer is set equal to one at step 1122 and this is strictly so the next time through the program upon subtracting one, the answer will still be zero, to limit to zero on a countdown. Step 1124 sets the zeros velocity to an absolute zero speed. From this speed decoding routine the zeros reference velocity is set to zero and returns. Going back to step 1112, this comparison is made with the present six-bit code against the six-bit code received 1/18 of second previously and they are alike, so now at step 1126 a check is made to see if the good code flag CDFGZ is equal to 1, which number can be any one of 1, 2, 3, 4, 5, or 6 and indicates the number of six bit, bit-by-bit comparisons that are required before allowing a recognized speed code. The first time through the program this flag will be zero because it has not been set yet. So for this first time in this case, the flag is not 1 and the program goes to step 1128 to increment the flag, and at this point the flag is 1. The program then goes to step 1116 which is in the confusion zone timer and goes through the countdown process again. The next cycle through the program, at step 1112 the comparison will be YES, and at step 1126 the good code flag will be checked to see it if is equal to 1. This time it is equal to 1. Step 1126 in effect provides a variable length comparator, since one comparison may not be enough, so the number 1 at step 1126 can be any desired number of comparisons desired to specify the number of consecutive six-bit comparisons. Upon eventually reaching the number of desired comparisons, the program goes to step 1130 to indicate a good speed code has been received from the decoder.

The program is now going to search the speed code table 1404 for an exact match. The table is eight locations long, and it has to be compared from the top to the bottom eight times, and for the six-bit code there are 48 possible combinations in this table for each code. So block 1130 sets up a counter equal to 6 to determine the checking of the six-bit rotating code. Step 1132 sets the loop counter equal to eight since the program goes through the table 1404 which is eight words long. Step 1134 sets the bias equal to zero, which is just a counter that is going to locate the relative position of the speed code inside the table. Step 1136 loads up the zeros speed code sub$_I$, which is the first one. Step 1138 checks to see if it agrees with the six bits just received to determine is this a good code. If the anser is NO, at step 1140 a shift is made of this six-bit code to the left. At step 1142 the shift counter of step 1130 is decremented and at step 1144 it is checked to see if the counter equals 0. If it is 0, this means that the six possibilities have been checked for a legal speed code. The answer for the first time through the program will be NO because the counter was six since it was set to six at step 1130. The program loops back to step 1138 and checks the code again, shifts it left at step 1140, decrements the count at step 1142 and after six passes through this routine, at step 1144 the count will be equal to 0, which indicates the first word in the table 1404 was not right, so the second one has to be checked. At step 1146, the six-bit shift counter is reset to 6, and at step 1148 one is subtracted off the loop counter which moves the operation down into the second word in the table 1404. At step 1150 one is added to the bias counter which again indicates the operation is in the second word. Then at step 1152 a check is made of the loop to see if the operation is finished, and if it is 0; again, the first time through the program it will not be 0. Going back to step 1136, a check is made at step 1138 to see if the second word is equal to the code. The program continues through one of these two inner loops until one of two things happen, the first will be an exit from step 1152 which says the program did not fine the code, the number after two comparisons agreed, but the number was not in the speed code table 1404 and the program goes to step 1114 to set the code flag to 0 since this was not a good code and the program goes through the confusion logic. If the exit at step 1138 is YES, this means a good speed code was found in the table and the bias set in step 1136 is its relative location. So the program goes from step 1138 to step 1154 which is a timer. Every time a good code is found, the timer is counted up. At step 1156 a check of the timer is made against the maximum timer, which maximum timer is the one that was selected out of the table 1414. This check is to determine is the time greater than the max or is it less than the max, since there may have been a change of the speed codes such that previously the vehicle was going along at 100 KPH and the maximum timer in this case would be 34 but the speed code was changed. The maximum timer will then drop to 16, and the program doesn't know a speed code transition was made all at once, so steps 1154, 1156, 1158 and 1160 takes the timer and counts it towards the max timer, so these four steps count the timer up or down, depending on where it is now and until it reaches the max timer. At step 1162 the bias is stored that was obtained in this previous searching loop and saved for future reference. Step 1164 stores the zero speed code and the new time max; this operation goes into the correct table using the bias at step 1162 and picks out the right number and stores it away. At step 1166 the same thing is done to store the speed code velocity. Step 1168 stores the number in the zeros reference velocity, which reference velocity is equal to the zeros speed code velocity. At step 1170 a check is made against the cutout car switch 71% to see if this needs to be modified lower. If the answer is NO, the program goes to step 1172. If the answer is YES, the 71% switch was on, and the program goes at step 1174 into the same relative position in the cutout car one velocity table to get that velocity and checks it against the reference velocity in step 1176. If the new velocity is lower than the reference velocity, the program goes to step 1178 and restores the reference velocity equal to the smaller of the two. The same things are done in steps 1172, 1180, 1182 and 1184 for a cutout car two switch. In other words, steps 1170, 1174, 1176 and 1178 check the cutout car switch, and set the reference velocity to the lowest value it is supposed to be, and then the same thing is done in steps 1172, 1180, 1182 and 1184 for the other switch. At this time the legal speed command for the zeros decoding routine is obtained. At step 1120 the registers are restored and leave.

The next program routine shown in FIG. 12 is the ones decoding routine, which is substantially the same as the program shown in FIG. 11, until step 1253 and step 1255, which drive the speedometer display. At step 1255, the program goes into the speed table 1404 and gets the correct speed to send to the operator's console. The legitimate speed code comes out of step 1255 as an output to the display. Step 1257 checks the ones speed code, this is the speed code after searching the table and finding a legitimate ones speed code, equal to the zeros speed code, which was determined in the program shown in FIG. 11. This is the first place where there is a comparison made between the results of these two program routines and if these two speed codes do not agree then the program goes to the confusion zone at step 1216 to count down the timer and go through the previously described operation. If the two speed codes do agree, at step 1259 a check is made to see if the bias equals 7; the reason for this is if the bias is equal to 7, the speed code is zero and that's a special speed code, so if the answer is YES, the program goes to the confusion zone timer at step 1216 as would any other miscomparison. Bias zero is the first one, and there are 8 in the table, so step 1259 is merely a check to see if the speed code was good and it was zero. At step 1261 several tests have been passed and the ones speed code is identical to the zeros speed code and they were not a zero speed command, so at step 1261 the max timer TMAXO is stored, and the ones speed code velocity which was found in the relative position of table 1403; this speed code velocity is stored in the ones reference velocity, which is just a working velocity. The program goes into the same check now for steps 1270, 1274, 1276 and 1278 that was made at steps 1170, 1174, 1176 and 1178 on the other routine. Steps 1272, 1280, 1282 and 1284 are checking against the cutout car two switch and checking the same as steps 1172, 1180, 1182 and 1184 of the other program routine. At step 1285 a check is made to insure that the ones reference velocity, which is the minimum of the command velocity cutout car one and cutout car two, against the zeros reference velocity, and if the answer is they are different, the program goes to the confusion zone at step 1216. If the two-speed reference velocities are the same, the program goes to step 1287 which goes to the SPEED table and gets the display speed pattern. Step 1289 sends it out to the display. Steps 1291, 1293, 1295 and 1297 is the countdown of the ones timer, to count up or down just like was done at steps 1154, 1156, 1158 and 1160 of the zeros decoding program. At step 1299 the program calls the speed error determining program. The third of the programs is the speed error determination routine, which determines the speed error by checking the actual velocity from the tachometer against the reference velocity. It takes the determined speed error and fits it to the curve shown in FIG. 10 to enhance the value of small numbers. The curve as shown in FIG. 10 includes offsets, such as around zero actual speed the speed error is multiplied by 2; and another section is linear in a one-to-one relationship and as the speed error gets larger it is divided by 2 to cut it down, with these offsets being provided to give a quicker response so the curve is flexible and comprises numbers that can be changed at will.

This program routine SERRT shown in FIG. 13 is entered from the ones speed decoding routine shown in FIG. 12. Steps 1302, 1304, 1306 and 1308 are reading the tach input and insuring a legitimate reading by reading it twice and comparing it to see if the numbers are the same and if they are not, it is read again to insure that at step 1310 a legitimate tach reading is made and stored away in working memory. Step 1312 determines the speed error, which speed error is the actual velocity minus the requested. At step 1314 this difference is stored in a working memory. The particular computer used here does not operate with signed arithmetic, such that negative numbers and positive numbers are treated a little differently, so as step 1316 a check is made to see if the speed error is less than zero. If it is, underspeed numbers are involved, and if it is not less than zero, then overspeed numbers are involved. The curve shown in FIG. 10 is symmetrical with an offset between the underspeed and the overspeed. So, for example, assume at step 1316 the number is not less than zero, so the program goes to step 1318 which checks is it equal to 0. For the particular case, assume not so at step 1320, this is an overspeed determination. Is the error greater than 15, and if it is, this is in the portion of the curve where the error is diviued by 2. If at step 1320 the error is not greater than 15, then at step 1322 a check is made to see is the error greater than 5. If the answer is YES, this says that the speed error is less than 5, or says it is 5 or less so at step 1324 the speed error is multiplied by 2 and at step 1326 an overspeed bias of 20 is added just for a fast response. Step 1328 adds 138 which is the midpoint in the table. The table runs from 0 to 255, so adding the midpoint moves over the center of the curve into the overspeed area. Step 1330 is a check to see if an overflow has occurred. If there is an overflow, step 1332 sets it equal to the max value. At step 1334 the number now determined is the adjusted speed error, which is called the enhanced speed error. Step 1135 checks to see if the adjusted speed error is within a certain tolerance of the analog speed error from CPU1. If the balance error is too large, the program sets an error flag at stop 1137 and then returns to step 1336 to output the adjusted speed error. If the errors are within the balance limit, the program goes straight from step 1135 to 1136. Step 1336 outputs the adjusted or enhanced speed error. Step 1338 toggles the watchdog timer switch, and step 1340 is the exit. At step 1338 the toggle is an output bit which changes state every time going through this program routine, and it generates a 9 Hertz square wave which is the dynamic signal representing the fact that this routine has been executed. This output bit is located as close as possible to step 1336 which is the speed error output so that the probability of going through step 1336 and not step 1338 or vice versa approaches zero and that's the reason that steps 1338 is in that specific location. One output of this routine is the watchdog timer, the dynamic signal, and the other output is the adjusted speed error which is at step 1336.

Going back to step 1320, if the speed error was greater than 15, it is divided by 2 at step 1342, and an offset is added at step 1344 and at step 1346 and then it goes through the same process again, beginning at step 1326. Back to step 1322, if the answer is YES, the speed error is between 5 and 15 and at this point in time it's linear so there is no need to divide it and the program goes through steps 1348, 1346, 1326 adding in the proper increments to fit it to the curve. In summary, this section of the program is for overspeed. It determines which section of the curve the speed error lies on, adds the proper constants to it, determines the speed error, sends it out and toggles the timer. At step 1318, if the speed error is zero, at step 1328 the midpoint is added. At step 1316 if the speed error is underspeed, at step 1350 a determination of the error in the opposite direction is begun. For the overspeed situation, the error was actual minus requested, and for the underspeed situation, at step 1350 the relationship is the requested minus actual, to get the sign changed. Step 1352 just stores it away. Step 1354 checks is the speed error greater than 5, and if the answer is YES, step 1356 multiplies it by 2. At step 1358 the midpoint is loaded so all these constants can be subtracted from the midpoint to determine the speed error. At step 1360 the speed is multiplied by 2 and is subtracted from the midpoint. Steps 1362 and 1364 check for underflow, and if it is under zero, it is set to zero, and then goes through previous steps 1334 to 1340. Back at step 154, if the speed error was not greater than 5, then step 1366 checks is it greater than 15 and if the answer is YES, this is the linear portion and the difference is set equal at step 1368 to this one value called TEMP and the midpoint minus 10 is loaded at step 1370. The midpoint is 138 and 10 is the offset. At step 1366 if the speed error was not greater than 15, step 1372 divides the error by 2, and step 1374 takes the midpoint and again includes the offset. In summary, steps 1350 to 1364 determine the speed error, subtract it from the midpoint with it being enhanced by either multiplied by 2 or divided by 2, limit it to zero and then output the adjusted speed error.

In FIG. 14 there are set forth two sets of tables. The left-hand tables 1400 are in relation to the ones data signal, and the right-hand tables 1402 are in relation to the zeros data. These tables are stored in ROM for each of the decoding routines in CPU2 and are totally independent. CPU2 has a first program using one set, and a second program using the other set. There is one more table 1404 called Speed, which includes speed code information that goes to the operator's console on the train to show how fast it should be going. In reality this is more or less a speedomter function to indicate the fastest speed the train vehicle is permitted to travel. The first table 1406 is the speed code table, and it contains six bits per each of the legal speeds, with the right-hand two columns being zeros. The control operation is to get a speed code in from the speed decoding module 410 shown in FIG. 4 and compare it to one of these six-bit codes. The second table 1408 is the speed code velocity table and the relative positions in this table with respect to the top is the speed that the vehicle is traveling; for example, for a 100 KPH speed code which would be the first line from table 1406, in the next table 1408, the vehicle is allowed to go 100 KPH with a scale factor so the number in the table 1408 is 200. Every velocity in this particular table 1408 is multiplied by 2 for scaling purposes. In order to get the speed control accuracy required, the speed relationships in table 1406 are multiplied by 2, so the accuracy obtainable is doubled from what it was before. The microprocessor speed control system permits this variable scaling to provide the desired control accuracy. As another example, more accuracy might be required when the vehicle is going 10 KPH than when the vehicle is going 100 KPH. Inside the table 1406 the scale factor can be changed. The third table 1410 is the cutout car one table set up at 71%. The fourth table 1412 is the cutout car two table which is set up at 86%. The bottom table 1414 is a confusion zone timer table, which shows the amount of time allowed for going from one track circuit to another when confusing input speed code information is received. These tables and related programs run at a rate of 18 times per second, so the number of counts in table 1414 divided by 18 is the time delay in seconds that is provided before responding to confusion input speed code information.

In FIG. 15 there are set forth two sets of tables for use in conjunction with the programs shown in FIGS. 7, 8 and 9. The left-hand set of tables 1500 are in relation to the ones data signal and the right-hand set of tables 1502 are in relation to the zeros data signal. These tables are stored in ROM for CPU1 which has a first program using one set and a second program using the other set. The first table 1504 in the set 1500 is the speed code table. The second table 1506 is the 86% cutout car speed table and the third table 1508 is the 71% cutout car speed table.

The speed code receiver in block 408 of FIG. 4 picks up the comma-free code information in the form of FSK speed codes, from the running rails and converts the speed code into ones and zeros data and clock. There are actually two datas and two clocks, for safety purposes of redundant reception and one of them will be for ones data and the other will be the zeros data. Then the speed decoding and speed error program 415 takes that data, which it is getting in serial form with the clock, and converts that serial data first to a parallel six-bit word of data and then does the transformation from that six-bit code of information to an eight-bit code which is proportional to the safe and maximum decoded speed that the train vehicle is allowed to travel. This decoded speed is the speed that the vehicle is not allowed to exceed, and if it ever goes above that speed, then it goes into overspeed, and normally the train vehicle accelerates up to something slightly less than this decoded speed and is controlled at that speed level by the speed maintaining program 417 shown in FIG. 4. If the speed code for some reason should change to a lower value, due to a speed code restriction because the vehicle is going through a switch, or is going through a station or is catching up with the train ahead, and so forth, the new decoded speed will go to a lower value, and the train vehicle will be in overspeed which will set the P signal to zero. The train vehicle will then slow down until it is below that new decoded speed, and the P signal is then allowed to be non-zero and the speed maintaining program 417 takes over. In effect the program 415 provides an upper bound on the train speed based on the information the vehicle is receiving from the track signal blocks.

It is necessary to determine whether or not the train vehicle is below this maximum decoded speed, and for this purpose the tachometer speed is read and subtracted from this maximum decoded speed to establish any speed error. As long as the speed error is in the underspeed direction then external vital interlock board allows the P signal. If the speed error goes in the overspeed direction, either because the train vehicle accelerated above the maximum decoded speed or the maximum decoded speed has changed to be below what the actual train vehicle speed is, then the P signal is not allowed to be generated and this places the train vehicle into full service brakes.

As far as the speed decoding and speed error determination program 415 is concerned, a speed error overspeed condition does not enable the P signal. The P signal, when it is allowed, is controlled by the speed maintaining program 417. The program 415 operates such that either an underspeed speed error permits the speed maintaining program 417 to control the train vehicle or an overspeed condition exits to not enable the P signal which is a full service brake operation by turning off the P signal generator. On steel-wheeled train vehicle systems, every time the speed code from the track wants the train vehicle to slow down, this is done by turning down the P signal to zero milliamps. It is an open loop braking system, which operates when going from a high speed to a lower speed, to request everything available in the way of brakes. The Sao Paulo vehicle braking system is open loop in regard to following the maximum speed profiles as per the track-provided speed code signals, and it is a closed loop braking system for following the vehicle stopping information provided by the program stop program 419 to control the precise stopping of a train vehicle in a passenger station. The output of the speed decoding speed error determination program 415 and the overspeed and balance circuits on the well-known vital interlock board is just an enable or disable for the P signal generator. It is normal for train vehicle speed control to go in and out of overspeed as the vehicle is going from station-to-station to follow the track speed code profile.

GENERAL OPERATION OF THE SPEED DECODING AND SPEED ERROR DETERMINATION

The input data to and the resultant outputs of the programs shown in FIGS. 7, 8 and 9 as compared with the programs shown in FIGS. 11, 12 and 13 is substantially the same. Two different programmers wrote these respective programs so the output arrived at from that input data would be obtained in a different manner. Thusly, either an oversight in writing the software programs or some malfunction in the computer would for these same conditions end up with a different erroneous output result so that when the respective decoded speed error outputs would not compare and this would be an overspeed condition to disable the P signal generator. For the determination of the speed error, the speed error is given a scaling based on the value of it, such that it is four bits per KPH if the speed error is less than 5 KPH, it is two bits per KPH if the speed error is between 5 and 15, and it is one bit per KPH if the speed error is greater than 15. This is done to give a very high gain for detecting that the speed error is overspeed or underspeed in the small speed error area where it is necessary to make this detection, and as the speed error moves away from this detection area its gain goes down so that the effective dynamic range is expanded because the signal is compressed. Even though the train vehicle is stopped and the vehicle is receiving a 100 KPH speed code or the received speed code is zero and the train is going 100 KPH, this speed error signal is not all the way against the dynamic range limit on either side, and any unbalanced condition can be detected such that the train will stop. In prior art systems, there has been a somewhat limited dynamic range on this speed decoding operation such that the speed control system might not know that it had an unbalance until the train vehicle speed got up to somewhere around 40 KPH and then the one speed error for the channel that requested 75 KPH, for example, would start coming out of saturation while the other channel that requested 100 KPH, for example, would still be in saturation; at that point they would be sensed to be different and in an unbalanced condition. This variable gain provides an output speed error which is a non-linear function of the speed error input, to allow wider dynamic range capabilities. In addition, each CPU, since it is calculating this speed error and it knows if it has a zero speed error when the train vehicle is the commanded speed, the added offset to this speed error assures that even if the external level detection is slightly off, it will be above the zero speed error threshold and indicating an overspeed condition. This is shown by the steep slope of the curve shown in FIG. 10, which is a plot of actual speed on the abscissa versus speed error output on the ordinate. The ordinate is the speed error output, which has the range from zero to 255. When the speed error is under speed and greater than 15, the curve has a small slope; the curve has a unity slope in this range of from 5 to 15; and between minus five end plus five it has a steep slope. In addition, a speed error offset is shown from 138, which is the midpoint, to 150. When the speed error is going from zero to plus a half, then instead of just changing two bits, which gives the offset; thusly, for the overspeed there has been added a 20-bit offset. The practical control problem here is that the speed error output gets converted to an analog signal and then goes into a threshold detector. The zero speed error is 138 which corresponds to approximately zero volts and this is the level that this threshold detector will detect. If the converted output is below zero volts, the threshold detector output indicates an underspeed condition and if it is above this zero volts value which is this midpoint of the range of this word, then the threshold detector indicates an overspeed and no longer enables the P signal generator. Thusly, the threshold detector only provides an output if the speed error is less than a certain zero speed error value and if it goes above that certain value then it does not provide an output. The signal shaping is operative such that through this ambiguous range a very sharp transition is made, and of course this is done in relation to both computers, and again they still both have to agree, or the balance will say STOP. Two big improvements are here provided over prior art practice; (1) a broader dynamic range is provided so a very high speed code can be received with the train at a very low speed and still the speed control system can detect that the two channels are different. Before this could not be done until getting closer to the lower of the commanded speeds, and (2) if the train vehicle is not receiving any speed code because the wayside transmitter is lost or the wayside transmitter is transmitting a zero speed code, or in making a transition from one track signaling block to the next track signaling block there is an area of confusion as the train vehicle is passing through this area. To avoid stopping in the confusion zone, timers operate for a predetermined time period before taking the decoded speed to zero. For the steel-wheeled train vehicle control systems two values are provided for this waiting time; if the speed code was a 10 KPH or a 30 KPH speed code the waiting time is 0.9 seconds before setting the overspeed limit to zero, and if the speed code was a 44 or higher KPH speed command, then the waiting time is 1.9 seconds. In FIG. 6, at blocks 606 and 612 the speed errors are determined and output to the vital interlock board 608 where they are converted into analog signals that go to the vital threshold detector to determine overspeed and underspeed.

The programs of FIGS. 9 and 13 each toggle a watchdog timer which is one bit out of the computer that changes state from the position it was the last time; if it was a logic one then it is set to a zero, and if it was a zero, then it is set to a one. Since the programs operate every eighteenth of a second, the net result of this toggling is a nine Hertz square wave output of this one bit from the computer, which is used in the P signal enable channel to enable the P signal generator. If for some reason either computer stops calculating the speed error, this toggle bit will go static and the P signal will get shut off.

In the prior art teachings the speed decoding was done in a vital manner and then the speed error determination, including reading the tachometer actual speed and comparing it with the speed code, was done in a redundant manner using analog circuitry where there was not similar signal available to use for establishing that the operation was proper.

We claim:

1. In apparatus for determining the movement of a passenger vehicle moving along a track and in response to a track provided input velocity signal including zeros data and ones data, the combination of means for determining the vehicle actual speed, first signal means for providing a first speed signal in accordance with a first decoding of the zeros data and providing a second speed signal in accordance with a first decoding of the ones data, second signal means for providing a third speed signal in accordance with a second decoding of the zeros data and providing a fourth speed signal in accordance with a second decoding of the ones data, means operative with at least one of said first and second signal means for determining a speed command for said vehicle, means for determining a first speed error signal in response to said first speed signal and second speed signal in relation to said actual speed, means for determining a second speed error signal in response to said third speed signal and said fourth speed signal in relation to said actual speed, and means for comparing the first speed error signal and the second speed error signal to determine one of the movement of the vehicle in response to said speed command or the stopping of the vehicle.

2. The vehicle movement determining apparatus of claim 1, with said first signal means including a first digital computer device having a valid speed code table in memory for each of said zeros data and said ones data, and with said second signal means including a second digital computer device having a valid speed code table in memory for each of said zeros data and said ones data.

3. The vehicle movement determining apparatus of claim 1, with said means for comparing the first speed error signal and the second speed error signal providing an enable signal to permit the vehicle to move only when a predetermined balance is present between said first and second speed error signals.

4. The vehicle movement determining apparatus of claim 1, including means responsive to said first speed error signal and said second speed error signal to provide a speed correction signal to said vehicle.

5. The vehicle movement determining apparatus of claim 1, with each of said first and second speed error signal determining means being operative with digital signals, and with said comparing means providing a fail-safe comparison of the first speed error signal and the second speed error signal for controlling the movement of said vehicle.

6. The vehicle movement determining apparatus of claim 1 operative at a predetermined time rate, with said means for comparing the first and second speed error signals providing a dynamic output signal for each time there is a determination of the first and second speed error signals.

7. The vehicle movement determining apparatus of claim 1, with said means for comparing being operative such that the first and second speed error signals must compare within a predetermined tolerance before determining the movement of said vehicle.

8. The vehicle movement determining apparatus of claim 1, including means for enhancing each of the first speed error signal and the second speed error signal as a function of the magnitude of those speed error signals to enable a better resolution of those speed error signals in particular relation to smaller speed error signals.

9. The vehicle movement determining apparatus of claim 1, including means for providing a first velocity control signal in response to said first speed signal and said second speed signal, with said first speed error signal being determined in response to a comparison of said first velocity control signal with the vehicle actual speed, and means for providing a second velocity control signal in response to said third speed signal and said fourth speed, with said second speed error signal being determined in response to a comparison of said second velocity control signal with the vehicle actual speed.

10. The vehicle movement determining apparatus of claim 1, with said input velocity signal and each of the first and second speed error signals being digital signals, and with said comparing means providing a comprison of the first and second speed error signals.

11. The vehicle movement determining apparatus of claim 1, with said actual speed determining means providing a first actual speed of the vehicle, with said first speed error signal determining means being responsive to the first actual speed, with said actual speed determining means providing a second actual speed of the vehicle, and with said second speed error signal determining means being responsive to the second actual speed.

12. The method of determining the movement speed of a vehicle by decoding an input speed control signal including zeros data and ones data, said method including the steps of determining the actual speed of the vehicle, providing a first speed signal by a first decoding of the zeros data and a first decoding of the ones data, providing a second speed signal by a second decoding of the zeros data and a second decoding of the ones data, providing a first speed error signal in response to the first speed signal and in relation to said actual speed, providing a second speed error signal in response to the second speed signal and in relation to said actual speed, and providing a vehicle speed control signal in response to each of said first speed error signal and said second speed error signal for determining the actual movement speed of the vehicle.

13. The input speed control signal decoding method of claim 12, with the step of providing a vehicle speed control signal including a comparison of the first speed error signal and the second speed error signal to establish that a predetermined balance is present therebetween before the vehicle speed control signal is provided.

14. The input speed control signal decoding method of claim 12, with the step of providing a vehicle speed control signal including the detection of an overspeed condition of the vehicle to prohibit providing the vehicle speed control signal.

* * * * *